(12) United States Patent
Zhang

(10) Patent No.: US 11,048,935 B2
(45) Date of Patent: Jun. 29, 2021

(54) GENERATING SHIFT-INVARIANT NEURAL NETWORK OUTPUTS

(71) Applicant: Adobe Inc., San Jose, CA (US)

(72) Inventor: Richard Zhang, Berkeley, CA (US)

(73) Assignee: ADOBE INC., San Jose, CA (US)

( * ) Notice: Subject to any disclaimer, the term of this patent is extended or adjusted under 35 U.S.C. 154(b) by 235 days.

(21) Appl. No.: 16/258,994

(22) Filed: Jan. 28, 2019

(65) Prior Publication Data

US 2020/0242353 A1    Jul. 30, 2020

(51) Int. Cl.
*G06K 9/00* (2006.01)
*G06N 3/08* (2006.01)
*G06N 20/10* (2019.01)
*G06T 5/00* (2006.01)

(52) U.S. Cl.
CPC ..... *G06K 9/00536* (2013.01); *G06K 9/00503* (2013.01); *G06K 9/00523* (2013.01); *G06N 3/084* (2013.01); *G06N 20/10* (2019.01); *G06T 5/002* (2013.01)

(58) Field of Classification Search
CPC .... G06N 20/10; G06N 3/084; G06K 9/00503; G06K 9/00523; G06T 5/002
See application file for complete search history.

(56) References Cited

U.S. PATENT DOCUMENTS

| | | | |
|---|---|---|---|
| 2018/0129893 A1* | 5/2018 | Son | G06N 3/063 |
| 2019/0065885 A1* | 2/2019 | Li | G06K 9/00744 |
| 2020/0175338 A1* | 6/2020 | Croxford | G06K 9/6271 |

FOREIGN PATENT DOCUMENTS

CN    108229497    *    6/2018    ..........    G06K 9/4671

OTHER PUBLICATIONS

Edward H Adelson, Charles H Anderson, James R Bergen, Peter J Burt, and Joan M Ogden. Pyramid methods in image processing. RCA engineer, 29(6):33-41, 1984.
Mathieu Aubry and Bryan C Russell. Understanding deep features with computer-generated im agery. In Proceedings of the IEEE International Conference on Computer Vision, pp. 2875-2883, 2015.
Aharon Azulay and Yair Weiss. Why do deep convolutional networks generalize so poorly to small image transformations? arXiv preprint arXiv:1805.12177, 2018.

(Continued)

*Primary Examiner* — Myron Wyche
(74) *Attorney, Agent, or Firm* — Keller Jolley Preece

(57) ABSTRACT

The present disclosure relates to systems, methods, and non-transitory computer readable media for generating shift-resilient neural network outputs based on utilizing a dense pooling layer, a low-pass filter layer, and a downsampling layer of a neural network. For example, the disclosed systems can generate a pooled feature map utilizing a dense pooling layer to densely pool feature values extracted from an input. The disclosed systems can further apply a low-pass filter to the pooled feature map to generate a shift-adaptive feature map. In addition, the disclosed systems can downsample the shift-adaptive feature map utilizing a downsampling layer. Based on the downsampled, shift-adaptive feature map, the disclosed systems can generate shift-resilient neural network outputs such as digital image classifications.

20 Claims, 15 Drawing Sheets

(56) References Cited

OTHER PUBLICATIONS

Joan Bruna and Stephane Mallat. Invariant scattering convolution networks. IEEE transactions on pattern analysis and machine intelligence, 35(8):1872-1886, 2013.
Peter J Burt and Edward H Adelson. The laplacian pyramid as a compact image code. In Readings in Computer Vision, pp. 671-679. Elsevier, 1987.
John Canny. A computational approach to edge detection. IEEE Transactions on pattern analysis and machine intelligence, (6):679-698, 1986.
Liang-Chieh Chen, George Papandreou, Iasonas Kokkinos, Kevin Murphy, and Alan L Yuille. Semantic image segmentation with deep convolutional nets and fully connected crfs. arXiv preprint arXiv:1412.7062, 2014.
Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. IEEE transactions on pattern analysis and machine intelligence, 40(4): 834-848, 2018.
Taco Cohen and Max Welling. Group equivariant convolutional networks. In International conference on machine learning, pp. 2990-2999, 2016.
Alexey Dosovitskiy and Thomas Brox. Generating images with perceptual similarity metrics based on deep networks. In Advances in Neural Information Processing Systems, pp. 658-666, 2016a.
Alexey Dosovitskiy and Thomas Brox. Inverting visual representations with convolutional networks. In Proceedings of the IEEE Conference on Computer Vision and Pattern Recognition, pp. 4829-4837, 2016b.
Logan Engstrom, Dimitris Tsipras, Ludwig Schmidt, and Aleksander Madry. A rotation and a translation suffice: Fooling cnns with simple transformations. arXiv preprint arXiv:1712.02779, 2017.
Carlos Esteves, Christine Allen-Blanchette, Xiaowei Zhou, and Kostas Daniilidis. Polar transformer networks. arXiv preprint arXiv:1709.01889, 2017.
Alhussein Fawzi and Pascal Frossard. Manitest: Are classifiers really invariant? arXiv preprint arXiv:1507.06535, 2015.
James E Fowler. The redundant discrete wavelet transform and additive noise. IEEE Signal Processing Letters, 12(9):629-632, 2005.
Kunihiko Fukushima and Sei Miyake. Neocognitron: A self-organizing neural network model for a mechanism of visual pattern recognition. In Competition and cooperation in neural nets, pp. 267-285. Springer, 1982.
Ross Girshick, Jeff Donahue, Trevor Darrell, and Jitendra Malik. Rich feature hierarchies for accurate object detection and semantic segmentation. In Proceedings of the IEEE conference on computer vision and pattern recognition, pp. 580-587, 2014. Kunihiko Fukushima and Sei Miyake. Neocognitron: A self-organizing neural network model for a mechanism of visual pattern recognition. In Competition and cooperation in neural nets, pp. 267-285. Springer, 1982.
Ian Goodfellow, Honglak Lee, Quoc V Le, Andrew Saxe, and Andrew Y Ng. Measuring invariances in deep networks. In Advances in neural information processing systems, pp. 646-654, 2009.
Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in Neural Information Processing systems, 2014a.
Ian J Goodfellow, Jonathon Shlens, and Christian Szegedy. Explaining and harnessing adversarial examples. arXiv preprint arXiv:1412.6572, 2014b.
Kaiming He, Xiangyu Zhang, Shaoqing Ren, and Jian Sun. Deep residual learning for image recognition. In Computer Vision and Pattern Recognition (CVPR), Jun. 2016.
Olivier J Hénaff and Eero P Simoncelli. Geodesics of learned representations. arXiv preprint arXiv:1511.06394, 2015.
Gao Huang, Zhuang Liu, Laurens Van Der Maaten, and Kilian Q Weinberger. Densely connected convolutional networks. In CVPR, vol. 1, pp. 3, 2017.

David H Hubel and Torsten N Wiese!. Receptive fields, binocular interaction and functional architecture in the cat's visual cortex. The Journal of physiology, 160(1):106-154, 1962.
Angjoo Kanazawa, Abhishek Sharma, and David Jacobs. Locally scale-invariant convolutional neural networks. arXiv preprint arXiv:1412.5104, 2014.
Ryan Kiros, Yukun Zhu, Ruslan R Salakhutdinov, Richard Zemel, Raquel Urtasun, Antonio Torralba, and Sanja Fidler. Skip-thought vectors. In Advances in neural information processing systems, pp. 3294-3302, 2015.
Alex Krizhevsky and Geoffrey Hinton. Learning multiple layers of features from tiny images. Tech-nical report, Citeseer, 2009.
Alex Krizhevsky, Ilya Sutskever, and Geoffrey E Hinton. Imagenet classification with deep convo-lutional neural networks. In Advances in neural information processing systems, pp. 1097-1105, 2012.
Yann LeCun, Bernhard E Boser, John S Denker, Donnie Henderson, Richard E Howard, Wayne E Hubbard, and Lawrence D Jackel. Handwritten digit recognition with a back-propagation network. In Advances in neural information processing systems, pp. 396-404, 1990.
Yann LeCun, Léon Bottou, Yoshua Bengio, and Patrick Haffner. Gradient-based learning applied to document recognition. Proceedings of the IEEE, 86(11):2278-2324, 1998.
Karel Lenc and Andrea Vedaldi. Understanding image representations by measuring their equivariance and equivalence. In Proceedings of the IEEE conference on computer vision and pattern recognition, pp. 991-999, 2015.
Thomas Leung and Jitendra Malik. Representing and recognizing the visual appearance of materials using three-dimensional textons. International journal of computer vision, 43(1):29-44, 2001.
Min Lin, Qiang Chen, and Shuicheng Yan. Network in network. arXiv preprint arXiv:1312.4400, 2013.
Jonathan Long, Evan Shelhamer, and Trevor Darrell. Fully convolutional networks for semantic segmentation. In Computer Vision and Pattern Recognition (CVPR), 2015.
David G Lowe. Object recognition from local scale-invariant features. In Computer vision, 1999. The proceedings of the seventh IEEE international conference on, vol. 2, pp. 1150-1157. Ieee, 1999.
Aravindh Mahendran and Andrea Vedaldi. Understanding deep image representations by inverting them. In Proceedings of the IEEE conference on computer vision and pattern recognition, pp. 5188-5196, 2015.
Alexander Mordvintsev, Christopher Olah, and Mike Tyka. Deepdream—a code example for visualizing neural networks. Google Research, 2:5, 2015.
Anh Nguyen, Jeff Clune, Yoshua Bengio, Alexey Dosovitskiy, and Jason Yosinski. Plug & play gen-erative networks: Conditional iterative generation of images in latent space. In CVPR, vol. 2, pp. 7, 2017.
Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017.
Avraham Ruderman, Neil C Rabinowitz, Ari S Morcos, and Daniel Zoran. Pooling is neither necessary nor sufficient for appropriate deformation stability in cnns. arXiv preprint arXiv:1804.04438, 2018.
Laurent Sifre and Stéphane Mallat. Rotation, scaling and deformation invariant scattering for texture discrimination. In Proceedings of the IEEE conference on computer vision and pattern recognition, pp. 1233-1240, 2013.
Eero P Simoncelli, William T Freeman, Edward H Adelson, and David J Heeger. Shiftable multiscale transforms. IEEE transactions on Information Theory, 38(2):587-607, 1992.
Karen Simonyan and Andrew Zisserman. Very deep convolutional networks for large-scale image recognition. arXiv preprint arXiv:1409.1556, 2014.
Jiawei Su, Danilo Vasconcellos Vargas, and Sakurai Kouichi. One pixel attack for fooling deep neural networks. arXiv preprint arXiv:1710.08864, 2017.

(56) References Cited

OTHER PUBLICATIONS

Andrea Vedaldi and Brian Fulkerson. Vlfeat: An open and portable library of computer vision algorithms. In Proceedings of the 18th ACM international conference on Multimedia, pp. 1469-1472. ACM, 2010.
Daniel E Worrall, Stephan J Garbin, Daniyar Turmukhambetov, and Gabriel J Brostow. Harmonic networks: Deep translation and rotation equivariance. In Proc. IEEE Conf. on Computer Vision and Pattern Recognition (CVPR), vol. 2, 2017.
Chaowei Xiao, Jun-Yan Zhu, Bo Li, Warren He, Mingyan Liu, and Dawn Song. Spatially transformed adversarial examples. arXiv preprint arXiv:1801.02612, 2018.
Fisher Yu and Vladlen Koltun. Multi-scale context aggregation by dilated convolutions. arXiv preprint arXiv:1511.07122, 2015.
Matthew D Zeiler and Rob Fergus. Visualizing and understanding convolutional networks. In European conference on computer vision, pp. 818-833. Springer, 2014.
Richard Zhang, Phillip Isola, Alexei A Efros, Eli Shechtman, and Oliver Wang. The unreasonable effectiveness of deep features as a perceptual metric. In CVPR, 2018.
Bolei Zhou, Aditya Khosla, Agata Lapedriza, Aude Oliva, and Antonio Torralba. Object detectors emerge in deep scene cnns. arXiv preprint arXiv:1412.6856, 2014.

\* cited by examiner

GENERATING SHIFT-INVARIANT NEURAL NETWORK OUTPUTS

BACKGROUND

Advancements in software and hardware platforms have led to a variety of improvements in systems that utilize convolutional neural networks or other machine learning models to analyze and/or classify digital images. For example, neural network systems are now able to identify an object within the digital image as belonging to one of potentially thousands of possible image classifications. Despite their convolutional nature, however, modern convolutional neural networks are not shift-invariant: small shifts in the input can cause drastic changes in the output. For instance, due to their lack of shift-invariance, many conventional neural network systems incorrectly generate varying outputs based on even minor shifts in input. Amid efforts to improve these conventional neural network systems, some systems can, for example, train a neural network using shift-based data augmentation by including shifted variations of inputs as part of the initial training data.

Despite these advances however, conventional neural network systems continue to suffer from a number of disadvantages, particularly in their accuracy, flexibility, and efficiency. Indeed, as mentioned, many conventional systems are not shift-invariant and therefore inaccurately generate outputs based on shifts in input. For example, based on a rotation or a translation of an object within a digital image, conventional image classification systems often classify the digital image incorrectly. Even systems that train a neural network using data augmentation, nonetheless often generate incorrect outputs, especially in cases where shifts in input do not align with augmented training data (e.g., where a neural network is trained using training images illustrating shifts in one direction but not in another direction). The strided pooling techniques utilized in many conventional neural network systems break shift-equivariance, resulting in the loss of commutable properties between shifting the input and extracting features within neural networks.

Additionally, many conventional systems are inflexible. For example, conventional neural network systems often require replacing an original pooling layer of a neural network with a specialized pooling layer to accommodate shifts in input. Such changes to the neural network itself are invasive and force systems to utilize a specific pooling layer, often different from the original pooling layer designed for the particular neural network. As a result of making such rigid modifications to neural networks, these conventional systems cannot flexibly adapt to applications of different neural networks (or other machine learning models), but instead force the neural networks to fit an indiscriminate, universally-applied pooling layer regardless of the application.

Further, some conventional neural network systems are inefficient. As an initial matter, training convolutional neural networks utilizing conventional systems requires significant training data and computing resources (e.g., analyzing millions of data samples to train the neural network). Moreover, as mentioned above many conventional systems require data augmentation to correctly classify shifted digital images. Training neural networks with the requisite augmented training data require even more processing time and computing resources to generate the augmented training data and then to retrain a neural network using the augmented training data.

Thus, there are several disadvantages with regard to conventional image classification systems.

SUMMARY

One or more embodiments described herein provide benefits and solve one or more of the foregoing or other problems in the art with systems, methods, and non-transitory computer readable media that generate shift-invariant neural network outputs utilizing low-pass filters in conjunction with pooling, filtering, and downsampling layers within neural networks. Indeed, the disclosed systems can resolve output inaccuracies (e.g., misclassifications) produced by many neural networks as a result of shifts in input to generate accurate shift-invariant outputs. For example, the disclosed systems can implement a low-pass filtering technique after densely pooling a feature map corresponding to a digital image and before downsampling the resultant shift-equivariant pooled feature map. In this manner, the disclosed systems can flexibly improve shift-invariance and output stability in a variety of machine learning models for benefits in a variety of applications such as classification, tagging, and retrieval, while also adapting to the original pooling layer of the neural network used for such application.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
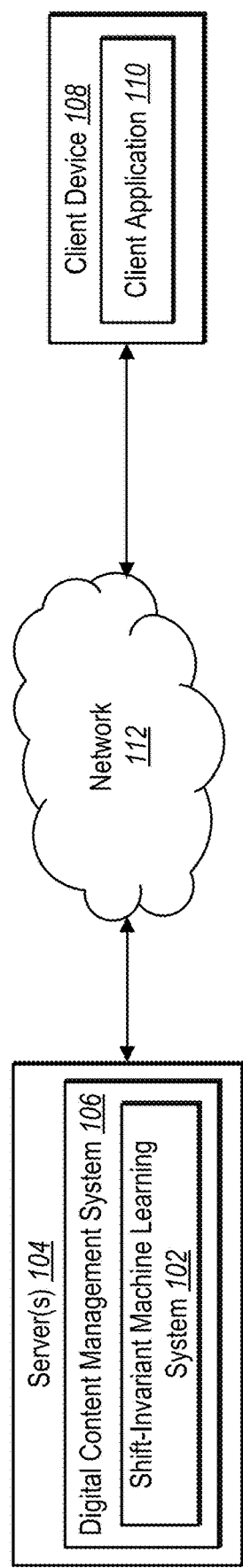
FIG. 1 illustrates an example environment for implementing a shift-invariant machine learning system in accordance with one or more embodiments.

One or more embodiments described herein provide benefits and solve one or more of the foregoing or other problems in the art with a shift-invariant machine learning system that generates shift-invariant outputs by utilizing a low-pass filtering technique after densely pooling feature values of a feature map and before downsampling a shift-equivariant feature map. For example, the shift-invariant machine learning system can implement a low-pass filter before downsampling to blur internal feature representations of an input (e.g., a digital image) within a pooled feature map. By low-pass filtering, in one or more embodiments the shift-invariant machine learning system reduces high-frequency components of an input and reduces aliasing to better preserve shift-equivariance within a neural network. The shift-invariant machine learning system can produce improved shift-invariance with regard to generated outputs, in addition to improved shift-equivariance of feature values within a neural network and spatially smoother learned convolutional kernels. Additionally, the shift-invariant machine learning system can remove the need for shift-based data augmentation in training a neural network.

To illustrate, in one or more embodiments the shift-invariant machine learning system can identify a feature map from a neural network. For example, the shift-invariant machine learning system can identify a feature map that includes feature values extracted from a digital image utilizing a neural network. To identify the feature map, the shift-invariant machine learning system can analyze the digital image utilizing one or more extraction layers of the neural network to generate feature representations of pixels within the digital image. Indeed, in some embodiments, feature values within the feature map correspond to pixels of the digital image.

Based on the feature map, the shift-invariant machine learning system can generate a pooled feature map based on a pooling technique. For instance, the shift-invariant machine learning system can utilize a dense pooling layer of a neural network to densely pool feature values of the feature map. In particular, the shift-invariant machine learning system can perform a max-pooling operation or some other type of pooling operation.

The shift-invariant machine learning system can further utilize a filtering technique with respect to the pooled feature map to generate a shift-equivariant (i.e., shift-adaptive) feature map. Particularly, the shift-invariant machine learning system can apply a low-pass filter to the pooled feature map to generate a shift-equivariant feature map from the pooled feature values of the pooled feature map. For example, in one or more embodiments the shift-invariant machine learning system applies a low-pass filter that includes a blur kernel, where the blur kernel includes kernel weights to apply to pooled feature values within the pooled feature map.

By applying a low-pass filter to the pooled feature map, the shift-invariant machine learning system can blur the feature representations of the pooled feature map to generate a feature map that is more robust to shifts in input—e.g., where distinct changes in pixel values have a less drastic effect on corresponding feature values and ultimately a less drastic effect on generated outputs (e.g., classifications). Specifically, the shift-invariant machine learning system can utilize a blur kernel of a low-pass filter to generate a shift-adaptive feature map, where the shift-adaptive (e.g., shift-equivariant) feature map is a blurred result of combining adjacent (or surrounding) pooled feature values from the pooled feature map.

In addition, the shift-invariant machine learning system can downsample the shift-adaptive feature map by utilizing a downsampling layer of a neural network. To downsample the shift-adaptive feature map, the shift-invariant machine learning system can reduce the dimensionality of a feature map by, for example, reducing the number of grid points of the shift-adaptive feature map. Thus, by downsampling the shift-adaptive feature map, the shift-invariant machine learning system can generate a downsampled, shift-adaptive feature map. In addition, the shift-invariant machine learning system can utilize the downsampled, shift-adaptive feature map to generate a shift-resilient (e.g., shift-invariant) neural network output. For example, the shift-invariant machine learning system can generate a shift-invariant classification of a digital image (e.g., the originally-analyzed digital image).

The shift-invariant machine learning system provides several advantages over conventional systems. For example, the shift-invariant machine learning system provides greater accuracy than conventional image classification systems. Indeed, unlike conventional systems that are highly susceptible to shifts in input, the shift-invariant machine learning system generates shift-equivariant feature representations of images pixels as well as shift-invariant classifications (or other outputs) of digital images. As a result of generating shift-invariant neural network outputs, the shift-invariant machine learning system improves accuracy relative to conventional systems (e.g., classifies digital images more accurately, even in cases where the digital image includes shifts in one or more pixels).

Even in cases where a neural network is trained using augmented training data, the shift-invariant machine learning system still provides improved accuracy. Indeed, training a neural network with augmented training data can improve its robustness to shifts in input to an extent. However, the shift-invariant machine learning system even improves the accuracy in these cases. For example, the shift-invariant machine learning system can train a neural network using augmented training data and can further apply the dense pooling, low-pass filtering, and downsampling operations described herein to improve the accuracy of a neural network beyond the accuracy obtained by only training the neural network using augmented training data.

In addition, the shift-invariant machine learning system provides greater flexibility than conventional image classification systems. To illustrate, the shift-invariant machine learning system implements dense pooling, filtering, and downsampling techniques that are adaptable to a variety of neural networks. Thus, unlike some conventional systems that require invasive restructuring of the neural network to replace pooling layers with specialized pooling layers, the shift-invariant machine learning system more flexibly adapts to native pooling layers already part of a neural network. Indeed, the shift-invariant machine learning system can adapt to apply filtering and downsampling techniques to a variety of neural network types while still generating shift-invariant neural network outputs.

Further, the shift-invariant machine learning system is more efficient than many conventional image classification systems. Indeed, as described in greater detail below, researchers have observed large improvements in efficiency when training convolutional neural networks utilizing the shift-invariant machine learning system. For example, due to the improved accuracy of incorporating the inductive bias of shift-invariance, the shift-invariant machine learning system does not require generating an augmented training dataset and training a neural network based on the augmented training data. Such improvements in classification when training without data augmentation thereby result in more efficient usage of data on the whole. Thus, the shift-invariant machine learning system requires less processing time and fewer computing resources than conventional systems that require training a neural network with augmented data.

Further still, the shift-invariant machine learning system produces smoother learned filters than conventional systems. Indeed, the shift-invariant machine learning system produces spatially-smoother learned blur kernels (e.g. convolutional kernels) as an unexpected result of adding a blurring low-pass filter layer to a neural network. Thus, the shift-invariant machine learning system not only provides improved shift-invariance with respect to neural network outputs, but the shift-invariant machine learning system also learns a smoother feature extractor for analyzing digital images (or other input).

As illustrated by the foregoing discussion, the present disclosure utilizes a variety of terms to describe features and benefits of the shift-invariant machine learning system. Additional detail is hereafter provided regarding the meaning of these terms as used in this disclosure. In particular, the term "neural network" refers to a trainable computer-based algorithm that analyzes data to make predictions. A neural network can refer to a tunable model that is trained to make predictions based on training data. In particular, a neural network includes a computer-implemented algorithm that analyzes input (e.g., training input) such as a digital image to make predictions and that improves in accuracy by comparing generated predictions against ground truth data and modifying internal parameters for subsequent predictions. In some embodiments, a neural network can employ supervised learning, while in other embodiments a neural network can employ unsupervised learning or reinforcement learning. In the same or other embodiments, a neural network can be a convolutional neural network and/or a deep neural network.

Relatedly, the term "train" refers to utilizing information to tune or teach a neural network. The term "training" (used as an adjective or descriptor, such as "training data" or "training digital image") refers to information or data utilized to tune or teach the model. In some embodiments, the shift-invariant machine learning system trains one or more neural networks to generate accurate predictions based on respective training data.

A neural network can have a particular architecture. For example, a neural network can be composed of a plurality of layers. As used herein, the term "layer" refers to a collection of nodes or neurons of the neural network. In particular, a layer can refer to a portion or section of a neural network that includes one or more neurons or other analytical units.

Within a neural network, adjacent layers can communicate with each other, passing information between constituent nodes within the layers in a forward propagation of information and/or back propagation of the information. A neural network can include a variety of different layers, such as an input layer, a convolutional layer, a hidden layer, a pooling layer (e.g., a dense pooling layer), an extraction layer, a filter layer (e.g., a low-pass filter layer), a downsampling layer, or an output layer.

As mentioned, the shift-invariant machine learning system utilizes one or more extraction layers of a neural network to extract feature values of an input to generate a feature map. As used herein, the term "feature map" refers to a collection of one or more feature values. In particular, a feature map can refer to a grid, a matrix, a vector, or a different multi-dimensional collection of feature values. In addition, a feature map can include positions or places for individual feature values that make up the feature map. For example, a feature map can include feature values corresponding to pixels of a digital image such that the feature map represents the digital image in feature-value form. Relatedly, the term "feature" or "feature value" refers to a digital encoding of one or more characteristics (e.g., a visual characteristic or an unobservable deep feature characteristic) of input data. The term feature includes latent or hidden features utilized by a neural network to generate a prediction (e.g., vectors that are not decipherable or comprehensible by humans). For example, a feature can include a digital representation of a characteristic (observable or not) of a digital image.

As also mentioned, the shift-invariant machine learning system generates a pooled feature map by implementing a dense pooling operation on the extracted feature map. As used herein, the term "pool" (or its variations such as "pooled" or "pooling") refers to a technique, process, or operation to translate or modify feature values from one form to another. For example, pooling can refer to max-pooling (selecting a highest value from a group), mean-pooling (determining a mean value for a group), or some other pooling operation to select or determine particular pooled feature values based on the extracted feature values. Thus, the term "pooled feature map" refers to a feature map that includes pooled feature values.

Relatedly, the term "dense" (or "densely") is used as a descriptor in relation to pooling operations (e.g., "densely pooling" or "dense pooling layer") to refer to a modified pooling operation where to compute the next layer of the network, every spatial position of the input layer is equally evaluated, rather than a subset. A dense pooling operation can refer to pooling feature values in an overlapping manner where a first pooled value is selected from a first set of a given feature value and a first adjacent feature value, and a second pooled value is selected from a second set of the given feature value and a second adjacent feature value (and so on for other adjacent feature values). Thus, a "dense pooling layer" refers to a pooling layer (a neural network layer that performs a pooling operation) that is evaluated densely—i.e., the spatial resolution on the output is the same as the input.

Additionally, the shift-invariant machine learning system generates a shift-adaptive feature map based on the pooled feature map. As used herein, the term "shift-adaptive" (e.g., shift-equivariant) is a descriptor referring to feature maps and/or layers within a neural network respond to shifts in input. A "shift" refers to a translation of the neural network input (e.g., a digital image). "Shift-adaptive," in turn, refers to an ability of feature maps and/or layers of a neural network to adjust or adapt to shifts in input. For example, a feature map is shift-adaptive if shifting the input produces a corresponding shifted feature map, where shifting and feature extraction are commutable. Indeed, in some embodiments, shift-adaptiveness refers to shift-equivariance of features within a neural network. Thus, the term "shift-adaptive feature map" refers to a feature map that includes "shift-adaptive feature values."

To generate a shift-adaptive feature map, the shift-invariant machine learning system can utilize a low-pass filter layer within a neural network. As used herein, the term "low-pass filter" (or sometimes simply "filter") refers to a neural network operation to remove or modify feature values of a feature map. For example, a low-pass filter can refer to a layer of a neural network that reduces or removes high-frequency components such as high feature values (e.g., as defined by the blur kernel).

By utilizing a low-pass filter layer, the shift-invariant machine learning system can utilize a blur kernel as part of the filter layer to filter out high feature frequency components. A "blur kernel" refers to a vector or grid of kernel weights to apply to feature values of a feature map. A blur kernel can be a two-dimensional n×n grid of kernel weights (e.g., multiplier values) to apply to various feature values of a feature map to generate corresponding shift-adaptive feature values. In some embodiments, a blur kernel can have a higher or lower dimensionality coinciding with the dimensionality of the feature map to which it is applied. In addition, a blur kernel can have different shapes or types such as a square, rectangle, triangle, Pascal, window, or least-squares blur kernel. The shift-invariant machine learning system can receive user input to modify a blur kernel to set its size, dimensions, and/or shape. The shift-invariant machine learning system can apply a blur kernel to modify a target feature value by generating a weighted combination of the target feature value together with feature values adjacent to the target feature value.

As mentioned, the shift-invariant machine learning system can further utilize a downsampling layer to reduce the number of grid points (e.g., the number of feature values) within the shift-adaptive feature map. As used herein, the term "downsample" (or its variations such as "downsampled" or "downsampling") refers to reducing dimensionality (e.g., reducing dimensionality of a feature map). For example, the shift-invariant machine learning sample can downsample a feature map by selecting particular feature values (e.g., every other, every third, etc.) and ignoring or removing feature values (e.g., in accordance with a particular downsampling operation). Thus, a "downsampled, shift-adaptive feature map" refers to a feature map including fewer shift-adaptive feature values than a shift-adaptive feature map.

As mentioned above, the shift-invariant machine learning system can further generate a shift-resilient neural network output based on a downsampled, shift-adaptive feature map. The term "shift-resilient" (e.g., shift-invariant) refers to a property of a neural network and/or a neural network output that is robust or resilient to shifts in input. A feature representation is shift-resilient if shifting the input results in an identical or similar (e.g., within a tolerance) neural network output. Indeed, in some embodiments, shift-resilience refers to shift-invariance of a neural network output where a neural network generates the same output even in response to a shifted variation of the input. For example, the shift-invariant machine learning system generates a shift-resilient classification of a digital image that correctly classifies digital images that include shifted variations of the same portrayed object.

Additional detail regarding the shift-invariant machine learning system will now be provided with reference to the figures. For example, FIG. 1 illustrates a schematic diagram of an example environment for implementing a shift-invariant machine learning system 102 in accordance with one or more embodiments. An overview of the shift-invariant machine learning system 102 is described in relation to FIG. 1. Thereafter, a more detailed description of the components and processes of the shift-invariant machine learning system 102 is provided in relation to the subsequent figures. Although many of the examples described in relation to the figures relate to analyzing and classifying digital images, the shift-invariant machine learning system 102 can be implemented in relation to other neural networks for different applications as well. For example, such machine learning systems are effective in spatially-sensitive applications such as object detection, denoising, demosaicing, as well as in neural networks that produce images (e.g., predicting colors for, and generating, a color image from a grayscale image).

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 15.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 15. Although FIG. 1 illustrates a single client device 108, in some embodiments the environment can include multiple different client devices, each associated with a different user. The client device 108 can communicate with the server(s) 104 via the network 112. For example, the client device 108 can receive user input and other activity information and provide the information pertaining to user activity (including selections of digital images) to the server(s) 104. Thus, the shift-invariant machine learning system 102 on the server(s) 104 can receive information to use in generating shift-resilient neural network outputs such as digital image classifications.

As shown, the client device 108 includes a client application 110. In particular, the client application 110 may be a web application, a native application installed on the client device 108 (e.g., a mobile application, a desktop application, etc.), or a cloud-based application where part of the functionality is performed by the server(s) 104. The client application 110 can present or display information to a user, including one or more digital images and/or digital image classifications. A user can interact with the client application 110 to provide user input to, for example, select and/or modify a digital image as well as to generate a classification for a digital image.

As illustrated in FIG. 1, the environment includes the server(s) 104. The server(s) 104 may generate, store, process, receive, and transmit electronic data, such as digital images and digital image classifications. For example, the server(s) 104 may receive data from the client device 108 in the form of a request to classify a digital image. In addition, the server(s) 104 can transmit data to the client device 108 to provide a classification of the digital image. The server(s) 104 can communicate with the client device 108 to transmit and/or receive data via the network 112. In some embodiments, the server(s) 104 comprises a content server. The server(s) 104 can also comprise an application server, a communication server, a web-hosting server, or a digital content management server.

As shown in FIG. 1, the server(s) 104 can also include the shift-invariant machine learning system 102 as part of a digital content management system 106. The digital content management system 106 can communicate with the client device 108 to generate, modify, and transmit digital content, such as various digital image editing and analysis tools.

Although FIG. 1 depicts the shift-invariant machine learning system 102 located on the server(s) 104, in some embodiments, the shift-invariant machine learning system 102 may be implemented by (e.g., located entirely or in part) on one or more other components of the environment. For example, the shift-invariant machine learning system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the shift-invariant machine learning system 102, bypassing the network 112. Additionally, the shift-invariant machine learning system 102 can include one or more databases (e.g., a digital image database and/or a feature value database) housed on the server(s) 104 or elsewhere in the environment.

Figure 2:
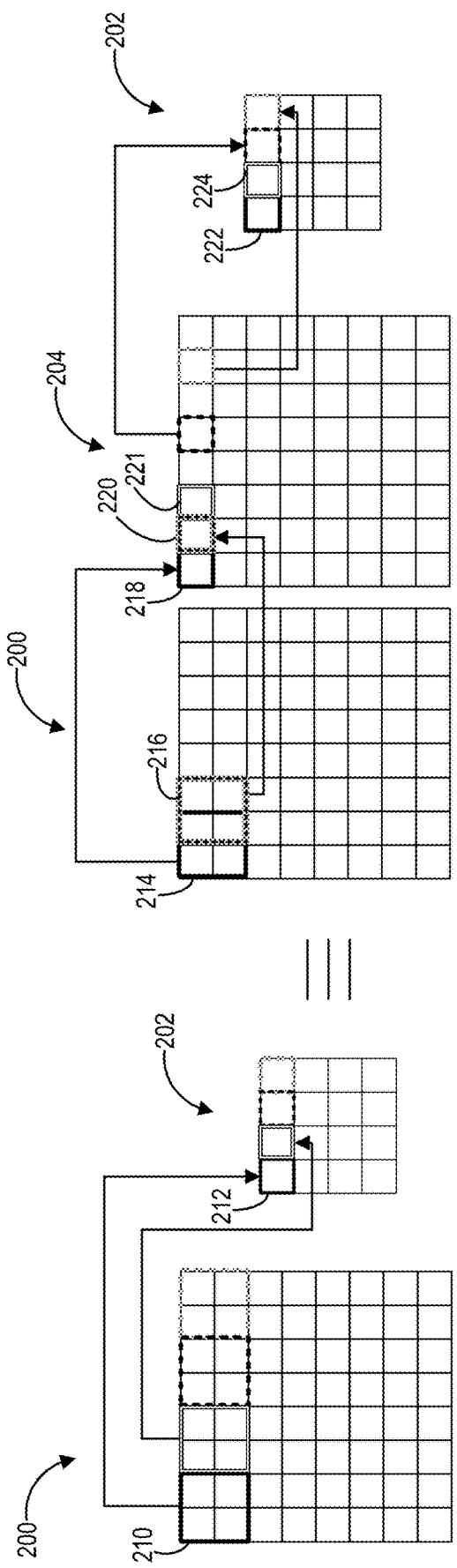
FIG. 2 illustrates an example breakdown of a strided pooling operation in accordance with one or more embodiments.
Figure 3:
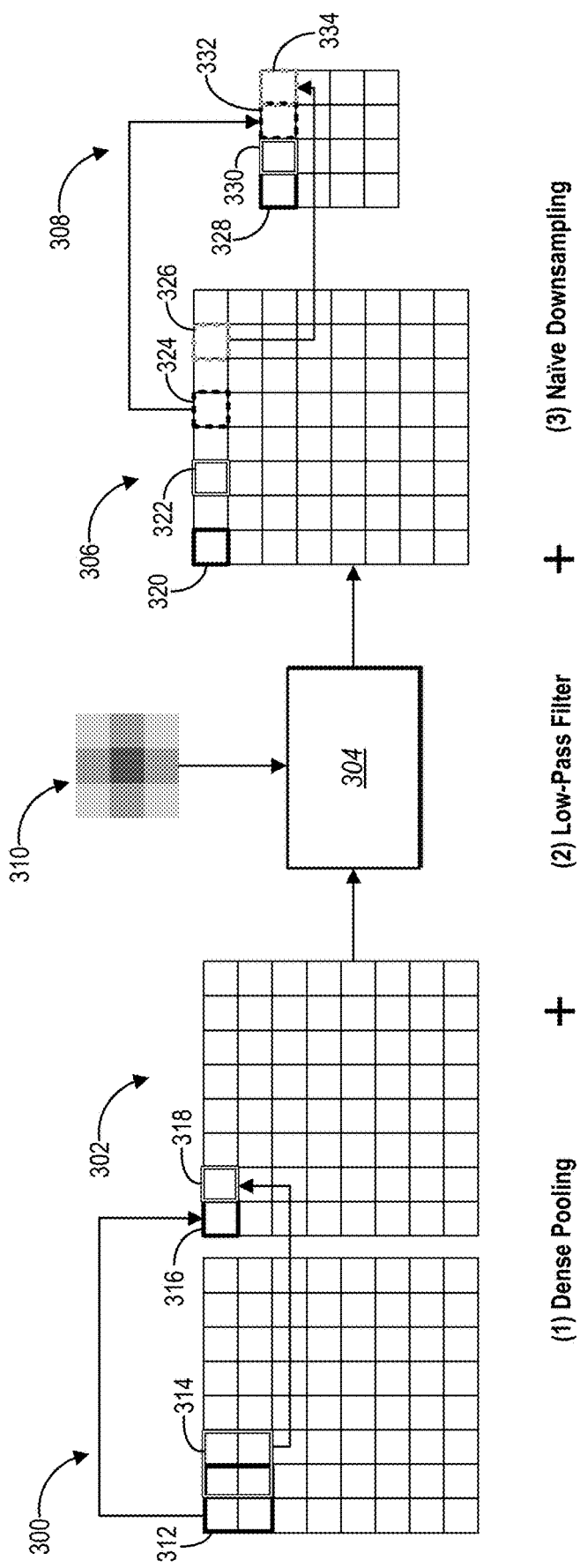
FIG. 3 illustrates an example process of generating a downsampled, shift-adaptive feature map in accordance with one or more embodiments.

As mentioned above, the shift-invariant machine learning system 102 can generate a downsampled, shift-adaptive feature map based on extracted features from a digital image. FIG. 2 illustrates an example process of generating a downsampled, pooled feature map (e.g., based on a digital image) as implemented by many conventional image classification systems. However, due to the nature of a conventional strided pooling operation, the downsampled, pooled feature map 202 of FIG. 2 loses equivariance and exhibits heavy aliasing. Thereafter, FIG. 3 illustrates an improved process of the shift-invariant machine learning system 102 to generate a downsampled, shift-adaptive feature map that is shift-adaptive and reduces aliasing.

Referring first to FIG. 2, many conventional image classification systems perform strided pooling via a pooling layer of a neural network in a single step to generate a downsampled, pooled feature map. For example, some conventional systems pool and downsample feature values from the feature map 200 by performing a max-pooling operation. In max-pooling feature values, a conventional image classification system takes groups of feature values from a feature map and selects highest (or maximum) values from among the groups (ignoring or not using the others) to use in generating a pooled feature map.

For example, as illustrated in FIG. 2, a conventional image classification system takes samples of the feature map 200—e.g., by selecting a 2×2 (or some other size) grid of feature values 210—and identifies a maximum or highest value among the four (or some other number) feature values. Thus, the conventional system generates the pooled feature value 212 within the downsampled, pooled feature map 202. As shown, a conventional system performs similar operations on other feature values (e.g., as indicated by the patterned boxes) of the feature map 200 to generate corresponding pooled feature values within the downsampled, pooled feature map 202 (e.g., as indicated by corresponding patterned boxes).

As shown in FIG. 2, the strided pooling illustrated by the transition from the feature map 200 to the downsampled, pooled feature map 202 is functionally equivalent to a two-step process of dense pooling and naïve downsampling, though conventional image classification systems do not perform the two steps separately (e.g., via independent layers of a neural network) and instead utilize a single strided pooling layer. As illustrated in FIG. 2, performing a dense pooling operation on the feature values 214 produces a corresponding pooled feature value 218. Similarly, performing a dense pooling operation on the feature values 216 produces a pooled feature value 220. Likewise, dense pooling can be performed on other feature values of the feature map 200, as indicated by the different patterned boxes of FIG. 2 that depict corresponding feature values. Thus, performing a dense pooling operation generates a pooled feature map 204 based on the feature map 200.

Additionally, a naïve downsampling operation is performed on the pooled feature values of the pooled feature map 204 (e.g., the pooled feature values 218 and 220) to generate the downsampled, pooled feature map 202. Naïve downsampling includes reducing the resolution and/or dimensionality of a feature map by sampling or selecting a subset of the feature values of the pooled feature map 204—e.g., every other, every third, or in accordance with some other downsampling function indicating a sampling period.

As illustrated, downsampling the pooled feature map 204 generates downsampled, pooled feature values corresponding to the pooled feature values of the pooled feature map 204, as indicated by the different patterned boxes in FIG. 2. For instance, the downsampled, pooled feature value 222 corresponds to the pooled feature value 218, and the downsampled, pooled feature value 224 corresponds to the pooled feature value 221. As shown, the pooled feature value 220 does not have a corresponding downsampled, pooled feature value within the downsampled, pooled feature map 202 because, in the example, samples from the pooled feature map 204 are taken for every other feature value (therefore skipping the pooled feature value 220).

Thus, as shown in FIG. 2, a conventional strided pooling technique, as utilized by many image classification systems, is the functional equivalent to performing a dense pooling operation followed by a naïve downsampling operation. Due to the naïve downsampling operation, conventional systems experience a loss of shift-adaptiveness and heavy aliasing (e.g., loss or confusion of feature values) between features, as indicated, for example, by the fact that no downsampled, pooled feature value is generated for the pooled feature value 220. Additional detail regarding the effects of downsampling on shift-adaptiveness, as well as how the shift-invariant machine learning system 102 resolves these issues, is provided below with reference to FIG. 7.

To solve these problems, in addition to providing the above-described advantages, the shift-invariant machine learning system 102 utilizes a dense pooling layer, a low-pass filter layer, and a downsampling layer to preserve shift-adaptiveness (e.g., shift-equivariance within the neural network), reduce aliasing, and improve shift-resilience (e.g., shift-invariance) with respect to generated outputs. Indeed, FIG. 3 illustrates an example dense pooling operation implemented by a dense pooling layer of a neural network, in addition to a low-pass filter operation of a low-pass filter layer and a naïve downsampling operation of a downsampling layer in accordance with one or more embodiments.

As illustrated in FIG. 3, the shift-invariant machine learning system 102 generates a pooled feature map 302 from a feature map 300. To generate the feature map 300 initially, the shift-invariant machine learning system 102 utilizes one or more extraction layers of a neural network to extract feature values (e.g., feature values 312 and 314). For example, the shift-invariant machine learning system 102 extracts feature values corresponding to pixels of a digital image. In some embodiments, a single pixel value within the feature map 300 corresponds to a single pixel within a digital image. Thus, in these or other embodiments the shift-invariant machine learning system 102 generates the feature map 300 with a resolution equivalent to the resolution of the digital image.

To generate the pooled feature map 302 from the feature map 300, the shift-invariant machine learning system 102 implements a dense pooling operation via a dense pooling layer of a neural network. More particularly, the shift-invariant machine learning system 102 densely pools the feature values 312 to generate the pooled feature value 316. In some embodiments, the shift-invariant machine learning system 102 densely pools the feature values 312 by utilizing a fully-connected pooling layer with a stride less than a dimension of a pooling kernel. Similarly, the shift-invariant machine learning system 102 densely pools the feature values 314 to generate the pooled feature value 318.

To elaborate, the shift-invariant machine learning system 102 utilizes a pooling kernel (e.g., an n×n grid of feature values from which to determine a feature value to represent the values within the grid) and strides the pooling kernel along the features of the feature map 300 based on a particular stride (e.g., a number of feature values moved with each step). As shown in FIG. 3, the shift-invariant machine learning system 102 utilizes a 2×2 pooling kernel and a stride of 1 so that the feature values 314 within the pooling kernel after the first stride overlap with the feature values 312 before the first stride. In other embodiments, however, the shift-invariant machine learning system 102 utilizes pooling kernels and strides of different sizes.

Likewise, the shift-invariant machine learning system 102 performs a dense pooling operation with respect to other (e.g., the remainder of) feature values within the feature map 300. Although FIG. 3 illustrates densely pooling 2×2 grids of feature values within the feature map 300 to generate the pooled feature map 302, in some embodiments the shift-invariant machine learning system 102 performs the dense pooling operation on different-sized groups of feature values.

As further illustrated in FIG. 3, the shift-invariant machine learning system 102 implements a low-pass filtering operation via a low-pass filter layer 304. More specifically, the shift-invariant machine learning system 102 filters pooled feature values from the pooled feature map 302 to generate a shift-adaptive feature map 306. The feature values of the shift-adaptive feature map 306 are shift-adaptive in the sense that the values shift in response to shifts in the original input. To generate the shift-adaptive feature map 306 from the pooled feature map 302, the shift-invariant machine learning system 102 utilizes a low-pass filter 304 that includes a blur kernel 310.

To elaborate, the shift-invariant machine learning system 102 applies the blur kernel 310 to the pooled feature values (e.g., the pooled feature values 316 and 318) of the pooled feature map 302. For instance, the shift-invariant machine learning system 102 strides the blur kernel 310 along the pooled feature map 302 to blur the pooled feature values. Indeed, the shift-invariant machine learning system 102 applies the kernel weights of the blur kernel 310 to each (or a subset) of the pooled feature values of the pooled feature map 302. In this way, the shift-invariant machine learning system 102 generates shift-adaptive feature values that are weighted combinations or amalgamations of feature values (e.g., target feature values and adjacent or surrounding feature values) within the pooled feature map 302. For example, the shift-invariant machine learning system 102 generates the shift-adaptive feature value 320 corresponding to the pooled feature value 316 as well as the shift-adaptive feature value 322 which corresponds to pooled feature value 318. The shift-invariant machine learning system 102 further generates the shift-adaptive feature values 324 and 326. Additional detail regarding applying the kernel weights of the blur kernel 310 is provided below with reference to FIG. 4.

Based on the shift-adaptive feature map 306, the shift-invariant machine learning system 102 further generates a downsampled, shift-adaptive feature map 308. More specifically, the shift-invariant machine learning system 102 performs a downsampling operation utilizing a downsampling layer to generate downsampled, shift-adaptive feature values from the shift-adaptive feature values (e.g., the shift-adaptive feature values 320, 322, 324, and 326) of the shift-adaptive feature map 306. In particular, the shift-invariant machine learning system 102 implements a naïve downsampling operation by reducing the resolution and/or dimensionality of a feature map by sampling or selecting a subset of the feature values of the shift-adaptive feature map 306—e.g., by selecting every other shift-adaptive feature value, every second shift-adaptive feature value, or in accordance with some other downsampling function indicating a sampling period. For example, the shift-invariant machine learning system 102 generates the downsampled, shift-adaptive feature values 328, 330, 332, and 334 that correspond to the shift-adaptive feature values 320, 322, 324, and 326 in accordance with their respective illustration patterns in FIG. 3.

Based on the downsampled, shift-adaptive feature map 308, the shift-invariant machine learning system 102 generates shift-resilient neural network outputs such as shift-invariant digital image classifications. Indeed, by utilizing the shift-adaptive characteristics of the feature maps generated by the shift-invariant machine learning system 102, the resultant output is more shift-resilient than neural network outputs of conventional systems. To illustrate, let a digital image with resolution H×W be represented by $X \in \mathbb{R}^{H \times W \times 3}$. An L-layer deep neural network can be expressed as a feature extractor $\mathcal{F}_l(X) \in \mathbb{R}^{H_l \times W_l \times C_l}$, with layer $l \in [0,]$, spatial resolution $H_l \times W_l$ and $C_l$ channels. Each feature map can also be upsampled to the original resolution, $\tilde{\mathcal{F}}_l(X) \in \mathbb{R}^{H \times W \times C}$.

A feature representation $\tilde{\mathcal{F}}$ is shift-adaptive (e.g., shift-equivariant) if shifting the input produces a shifted feature map, where the shift in input and the extraction of features are commutable. Indeed, the shift-invariant machine learning system 102 can generate a shift-adaptive feature map including shift-adaptive feature values, as given by:

$$\text{Shift}_{\Delta h, \Delta w}(\tilde{\mathcal{F}}(X)) = \tilde{\mathcal{F}}(\text{Shift}_{\Delta h, \Delta w}(X)) \forall (\Delta h, \Delta w).$$

In addition, a feature representation $\tilde{\mathcal{F}}$ is shift-resilient (e.g., shift-invariant) if shifting the input results in an identical (or similar within a threshold) representation. Indeed, the shift-invariant machine learning system 102 can generate shift-resilient feature representations based on shifts in input, as given by:

$$\tilde{\mathcal{F}}(X) = \tilde{\mathcal{F}}(\text{Shift}_{\Delta h, \Delta w}(X)) \forall (\Delta h, \Delta w).$$

In some embodiments, the layer l=0 corresponds to the raw pixels of the digital image, and the final layer L corresponds to a probability distribution over D classes $\mathcal{F}_L \in \Delta^{1 \times 1 \times D}$. The shift-invariant machine learning system 102 reduces spatial resolution throughout a neural network until all spatial resolution is lost and the features are of shape $\mathbb{R}^{1 \times 1 \times C_l}$. Averaging across an entire feature map spatially and subsequently using fully-connected layers shows that shift-resilient outputs emerge from shift-adaptive features. In some cases, the shift-invariant machine learning system 102 provides improvements in modulo-N shift-equivariance and modulo-N shift-invariance. For example, in these cases, the above equations hold when input shifts (Δh,Δw) are integer multiples of N. For example, modulo-2 shift-invariance means that even-pixel shifts of the input result in an accurate (e.g., identically-shifted) feature representation, but odd-pixel shifts may not.

Figure 4:
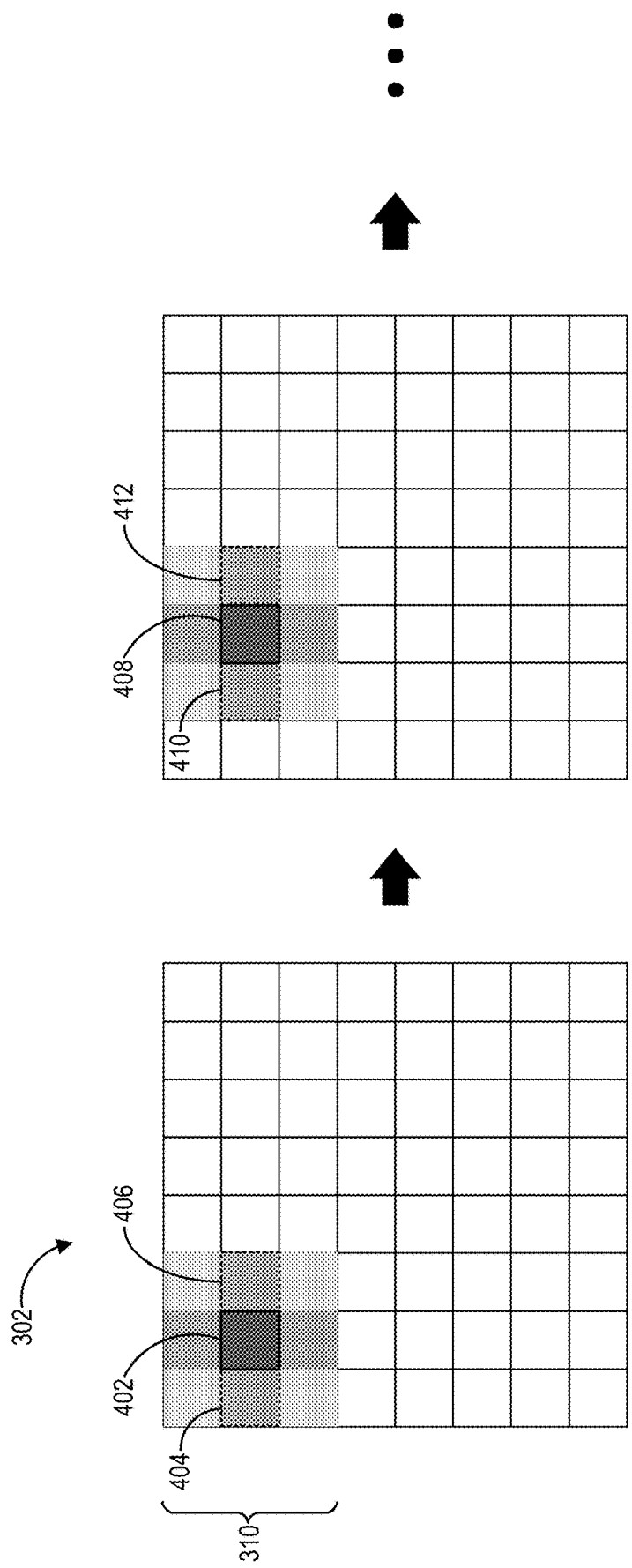
FIG. 4 illustrates an example application of a blur kernel in accordance with one or more embodiments.

As mentioned, the shift-invariant machine learning system 102 utilizes a low-pass filter layer including a blur kernel to generate a shift-adaptive feature map. FIG. 4 illustrates additional detail of the blur kernel 310 as applied to the pooled feature map 302. In particular, the shift-invariant machine learning system 102 identifies and selects a target feature value and centers the blur kernel 310 on the target feature value. Additionally, the shift-invariant machine learning system 102 applies the blur kernel 310 to the target feature value and the adjacent feature values. Further, the shift-invariant machine learning system 102 strides the blur kernel 310 along the pooled feature map 302 to apply the blur kernel to additional target feature values and the feature values that are adjacent to the additional target feature values.

As illustrated in FIG. 4, the shift-invariant machine learning system 102 applies the blur kernel 310 to the target feature value 402. As indicated by the different shading of the illustrated blur kernel 310, the blur kernel 310 includes different kernel weights that the shift-invariant machine learning system 102 applies to the target feature value 402 and the adjacent feature values. For example, the shift-invariant machine learning system 102 applies a first heavier kernel weight (as indicated by the darker shading) to the target feature value 402, applies a second lighter kernel weight to the adjacent feature values 404 and 406 (as well as those directly above and below the target feature value 402, though not numbered), and applies a third still lighter kernel weight to the feature values that have only a corner intersecting with a corner of the target feature value 402.

In some embodiments, the kernel weights are multipliers that the shift-invariant machine learning system 102 applies to the respective pooled feature values of the pooled feature map 302. Upon applying the blur kernel 310, the shift-invariant machine learning system 102 generates a new shift-adaptive feature value for (e.g., to replace) the target feature value 402. For instance, the shift-invariant machine learning system 102 applies the respective kernel weights to the feature values within the blur kernel 310 and combines (e.g., sums) the resulting weighted feature values to generate a shift-adaptive feature value. Thus, the new shift-adaptive feature value corresponding to the target feature value 402 is a weighted combination of the target feature value 402 and the adjacent feature values.

Additionally, the shift-invariant machine learning system 102 strides the blur kernel 310 to apply to additional target feature values. For example, as illustrated in FIG. 4, the shift-invariant machine learning system 102 strides the blur kernel 310 to center on the target feature value 408. The shift-invariant machine learning system 102 applies the kernel weights of the blur kernel 310 to the target feature value 408 and to the adjacent feature values (e.g., feature values 410 and 412, in addition to the others within the blur kernel 310, though not numbered). Thus, the shift-invariant machine learning system 102 generates a shift-adaptive feature value corresponding to the target feature value 408. Likewise, the shift-invariant machine learning system 102 generates shift-adaptive feature values for more (e.g., all) of the pooled feature values of the pooled feature map 302.

As a result of applying the blur kernel 310, the shift-invariant machine learning system 102 generates a shift-adaptive feature map (e.g., the shift-adaptive feature map 306) based on the pooled feature map 302. Thus, the shift-invariant machine learning system 102 blurs the feature values of the pooled feature map 302 by generating the weighted combinations of feature values, where shift-adaptive feature values are an amalgamation of a target feature value and adjacent feature values. In this way, the shift-invariant machine learning system 102 is less susceptible to abrupt changes or shifts in original pixel values of an input digital image.

Although not illustrated in FIG. 4, the shift-invariant machine learning system 102 can apply different blur kernels with different kernel weights. For example, a blur kernel can include a 3×3 grid of kernel weights, a 2×2 grid of kernel weights, a 1×3 grid of kernel weights, a 3×1 grid of kernel weights, or a grid of kernel weights having a different size. In some embodiments, the shift-invariant machine learning system 102 utilizes a blur kernel that has more than two dimensions. Additionally, a blur kernel can have various kernel weights for generating shift-adaptive feature values. In some embodiments, the kernel weights are values less than 1. Such kernel weights include, but are not limited to, 0.1, 0.2, 0.25, 0.5, 0.75, or others. Further, although FIG. 4 illustrates a stride of one feature value to the right, the shift-invariant machine learning system 102 can stride a blur kernel using strides of different sizes and/or in different directions/dimensions.

Based on generating a shift-adaptive feature map (e.g., the shift-adaptive feature map 306), the shift-invariant machine learning system 102 further utilizes a downsampling operation to generate a downsampled, shift-adaptive feature map (e.g., the downsampled, shift-adaptive feature map 308), as described above. Additionally, due to the shift-adaptive nature of the neural network implemented by the shift-invariant machine learning system 102, the shift-invariant machine learning system further generates a shift-resilient neural network output. Indeed, FIG. 5 illustrates an example where the shift-invariant machine learning system 102 analyzes various digital images that are shifted variations of the same object and classifies the digital images with the same classification.

Figure 5:
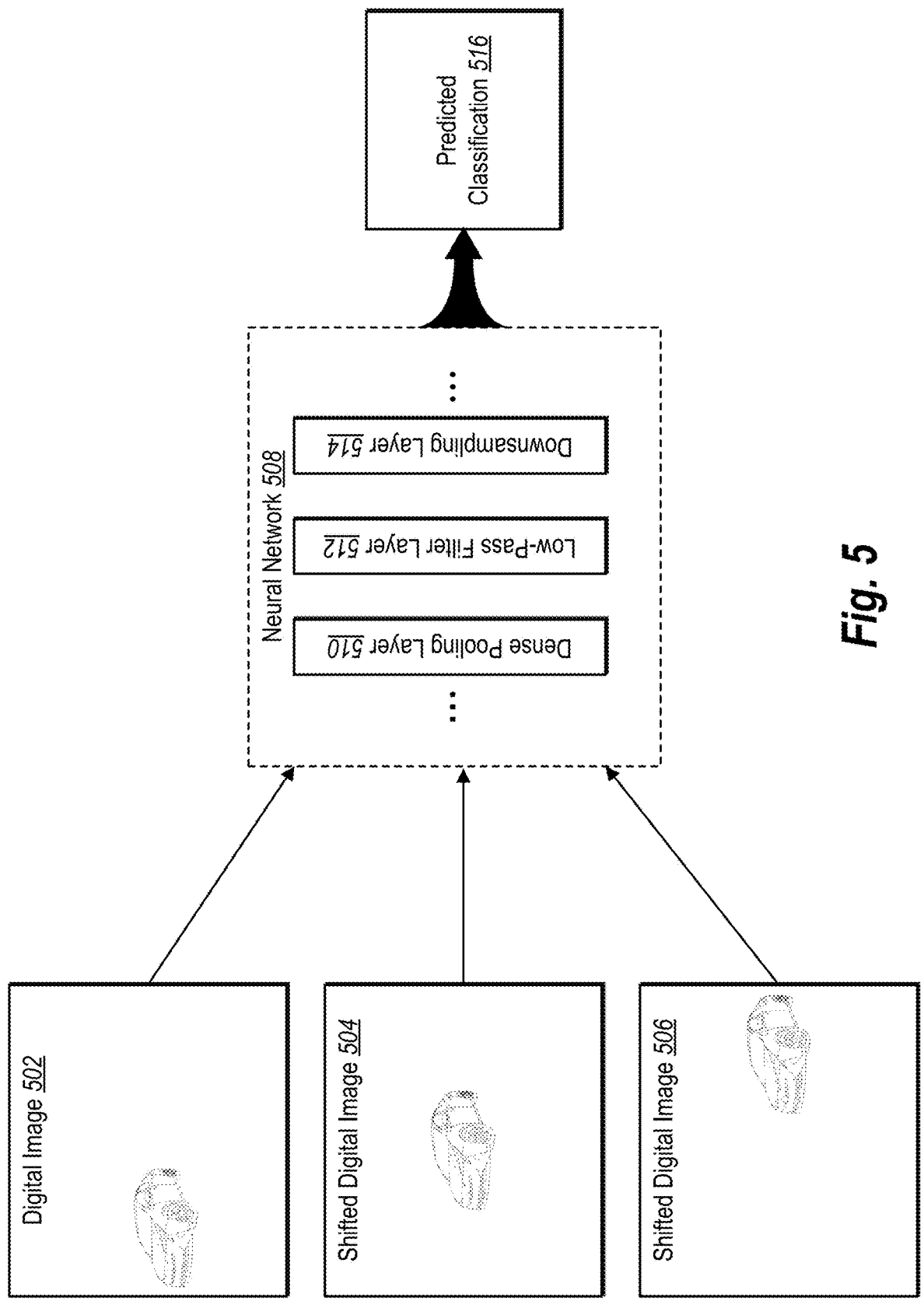
FIG. 5 illustrates an example implementation of a neural network to classify shifted digital images in accordance with one or more embodiments.

As illustrated in FIG. 5, the shift-invariant machine learning system 102 analyzes three different digital images, including the digital image 502, the shifted digital image 504, and the shifted digital image 506. As shown, the three different digital images portray shifted versions of the same automobile. To classify the digital image 502, the shift-invariant machine learning system 102 utilizes the neural network 508 including a dense pooling layer 510, a low-pass filter layer 512, and a downsampling layer 514, as described herein. Particularly, the shift-invariant machine learning system 102 extracts feature values corresponding to pixels of the digital image 502, densely pools the feature values to generate a pooled feature map, applies a low-pass filter to the pooled feature map to generate a shift-adaptive feature map, and downsamples the shift-adaptive feature map to generate a downsampled, shift-adaptive feature map. Based on the downsampled, shift-adaptive feature map, the shift-invariant machine learning system 102 generates a shift-resilient output for the digital image 502 in the form of the predicted classification 516. Although FIG. 5 illustrates a single set or unit of layers (e.g., a set or unit that includes the dense pooling layer 510, the low-pass filter layer 512, and the downsampling layer 514), in some embodiments the neural network 508 includes multiple (e.g., hundreds) sets or units of these layers.

In addition, the shift-invariant machine learning system 102 analyzes the shifted digital image 504 utilizing the neural network 508. Due to the shift-resilient nature of the neural network 508 including the dense pooling layer 510, the low-pass filter layer 512, and the downsampling layer 514, the shift-invariant machine learning system 102 generates the same predicted classification 516. Indeed, despite shifts in the input (e.g., illustrated by the shifted digital image 504 being a shifted variation of the digital image 502), the shift-invariant machine learning system 102 generates a shift-resilient predicted classification 516 such as "car," "vehicle," or "automobile." Similarly, the shift-invariant machine learning system 102 analyzes the shifted digital image 506 utilizing the neural network 508 to generate the same predicted classification 516.

Figure 6:
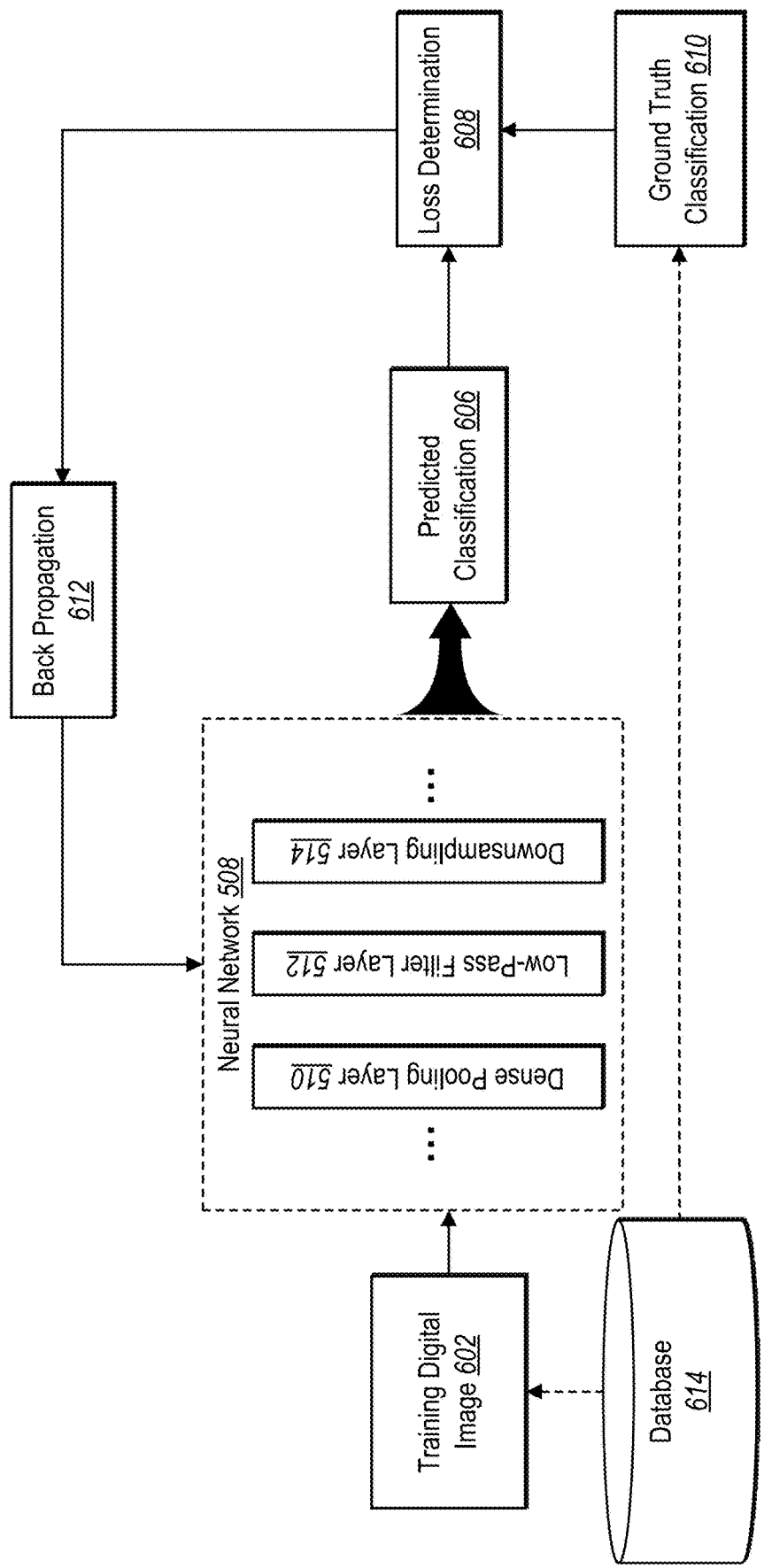
FIG. 6 illustrates an example process of training a neural network in accordance with one or more embodiments.

In addition to applying the neural network 508 to generate the predicted classification 516, in some embodiments the shift-invariant machine learning system 102 trains the neural network 508 to generate accurate predicted classifications (or other neural network outputs). FIG. 6 illustrates an example process by which the shift-invariant machine learning system 102 trains the neural network 508 to generate predicted classifications that are accurate (within a threshold error or measure of loss).

As illustrated in FIG. 6, the shift-invariant machine learning system 102 trains the neural network 508 to generate accurate predictions. Particularly, the shift-invariant machine learning system 102 accesses a training digital image 602 within a database 614 to utilize as training data for the neural network 508. In some embodiments, the shift-invariant machine learning system 102 trains the neural network 508 with augmented training data where, for instance, the training digital image 602 is a shifted version of a digital image. For example, the shift-invariant machine learning system 102 inputs the training digital image 602 into the neural network 508, whereupon the neural network 508 generates a predicted classification 606, as described above. Indeed, the neural network 508 analyzes the training digital image 602 utilizing its various layers and weights. Based on the analysis of the training digital image 602, the neural network 508 generates a predicted classification 606 of the training digital image 602. For example, the neural network 508 predicts a classification label for the training digital image 602 by identifying or discerning an object portrayed within the training digital image 602 (e.g., "car," "dog," "person," "tree," etc.).

In addition, the shift-invariant machine learning system 102 accesses a ground truth classification 610 from the database 614 that corresponds to the training digital image 602. More specifically, the shift-invariant machine learning system 102 identifies a classification that is the actual or ground truth classification of the training digital image 602. Indeed, the shift-invariant machine learning system 102 stores, within the database 614, training data that includes training digital images and corresponding ground truth classifications or classification labels.

Based on identifying the ground truth classification 610, the shift-invariant machine learning system 102 further generates a loss determination 608. More particularly, the shift-invariant machine learning system 102 compares the predicted classification 606 generated by the neural network 508 with the ground truth classification 610 associated with the training digital image 602. For example, to compare the predicted classification 606 with the ground truth classification 610, the shift-invariant machine learning system 102 utilizes a loss function such as a cross entropy loss function, a mean square error loss function, a Kullback-Liebler loss function, or some other appropriate loss function. Thus, the shift-invariant machine learning system 102 determines an error or measure of loss associated with the neural network 508. By generating the loss determination 608, the shift-invariant machine learning system 102 determines whether the neural network 508 needs to be adjusted to improve the accuracy to reduce the error to be within a tolerance or threshold.

As further illustrated in FIG. 6, the shift-invariant machine learning system 102 implements a back propagation 612. In particular, based on the determined error or measure of loss associated with the neural network 508, the shift-invariant machine learning system 102 performs one or more modifications to reduce or minimize the error or measure of loss. For example, the shift-invariant machine learning system 102 modifies weights associated with various neurons or layers of the neural network 508 to adjust internal neural network parameters and thereby affect the final generated output associated with the neural network 508.

Upon modifying weights associated with the neural network 508, the shift-invariant machine learning system 102 identifies another training digital image and its corresponding ground truth classification from the database 614 to input into the neural network 508. The neural network 508, in turn, generates another predicted classification. In addition, the shift-invariant machine learning system 102 generates another loss determination to determine to what extent the neural network 508 needs to be adjusted to further increase its accuracy in generating predicted classifications. Further, the shift-invariant machine learning system 102 implements another back propagation to modify weights of the neural network 508 to yet further reduce the error associated with the neural network 508.

By repeating the process illustrated in FIG. 6 (e.g., for several or many iterations/epochs), the shift-invariant machine learning system 102 improves the accuracy of the neural network 508 until the neural network 508 generates predicted classifications that are within a threshold similarity of ground truth classifications—or until the error associated with neural network 508 is below a particular error threshold. In addition, while FIG. 6 illustrates training a particular example neural network 508 that classifies digital images, the shift-invariant machine learning system 102 can train additional or alternative neural networks for different applications as mentioned above.

Figure 7:
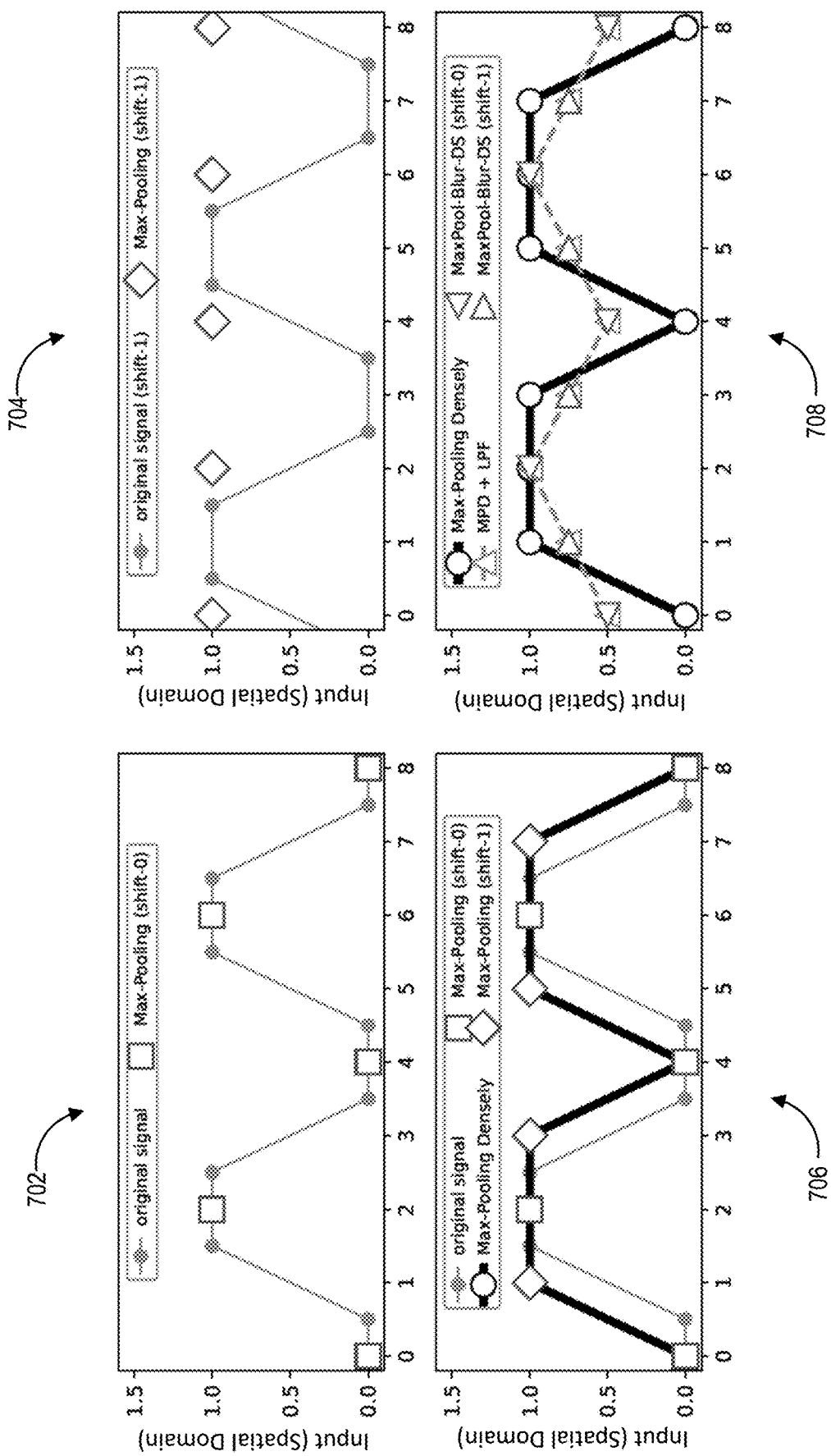
FIG. 7 illustrates example graphs to show shift-adaptive feature values from an input in accordance with one or more embodiments.

As mentioned, the shift-invariant machine learning system 102 is shift-adaptive, where shifts in input cause the shift-invariant machine learning system 102 to generate corresponding shifts in feature representations of the input. FIG. 7 illustrates an example of how shifts in input can affect feature representations in systems that are not shift-adaptive. FIG. 7 also illustrates an example of how the shift-invariant machine learning system 102 generates shift-adaptive feature representations based on shifts in input.

As illustrated in FIG. 7, the graphs 702, 704, 706, and 708 depict an example one-dimensional input of [0, 0, 1, 1, 0, 0, 1, 1, 0, 0]. Based on this input, the graph 702 illustrates results of a conventional max-pooling operation with no shift in the input and using a kernel of size 2 and a stride of 2 to effectively generate a downsampled value at every even interval (e.g., 0, 2, 4, 6, and 8). For instance, max-pooling the input involves sampling the input to produce the feature values of [0, 1, 0, 1, 0], as indicated by the squares in the graph 702. Indeed, taking the maximum of each pair of input values, the maximum of [0, 0] is 0, the maximum of [1, 1] is 1, and so on to get the downsampled values of [0, 1, 0, 1, 0] from the input [0, 0, 1, 1, 0, 0, 1, 1, 0, 0].

The graph 704, however, illustrates the issues with conventional max-pooling (or other strided pooling) techniques based on a shift in the original input. Indeed, the graph 704 depicts a shift where max-pooling at even intervals yields downsampled values [1, 1, 1, 1, 1], as indicated by the diamond shapes. For example, max-pooling from pairs of values such as [0, 1] and [1, 0] yield maximum values of 1 for each pair. Thus, comparing the downsampled feature values of the graph 702 (with no shift) to the pooled feature values of the graph 704 (with a shift), pooling operations of conventional systems lose shift-adaptiveness.

Additionally, the graph 706 illustrates generating feature values utilizing a dense max-pooling operation with a kernel size of 2 and a stride of 1, as shown by the thick black line. For example, the dense pooling operation of the graph 706 involves determining a maximum between each adjacent pair of input values such as, starting from the left, [0, 0], [0, 1], [1, 1], [1,0], and so on to produce feature values of [0, 1, 1, 1, 0, 1, 1, 1, 0], as shown in FIG. 7. In a sense, densely pooling the input effectively produces both of the sets of values from the graphs 702 and 704. By evaluating densely, the feature values of the graph 706 also keep shift-adaptiveness. However, it does this by having to keep the entire spatial resolution.

By contrast, the graph 708 of FIG. 7 illustrates an example of how the shift-invariant machine learning system 102 maintains shift-adaptiveness of generated feature values while also allowing for downsampling. In particular, the shift-invariant machine learning system 102 applies a low-pass filter to the pooled feature values generated by densely pooling the input. In addition, the shift-invariant machine learning system 102 samples the low-passed version of the feature values. Indeed, as described above, a max-pooling layer can be described as a composition of two functions: max-pooling densely and naïve downsample. For example, a conventional max-pooling operation can be expressed as:

$$\text{MaxPool}_{k,s}(X) = \text{Downsample}_s(\text{MaxPool}_{k,1}(X)).$$

From the graph 708, the shift-invariant machine learning system 102 densely pools the input values to generate the pooled feature values indicated by the circles on the thick black line. In addition, the shift-invariant machine learning system 102 applies a low-pass filter with a blur kernel of [0.25, 0.5, 0.25] to generate shift-adaptive feature values indicated by the triangles of the graph 708. For example, in some embodiments the shift-invariant machine learning system 102 implements a MaxPoolBlurDownSample ("MaxPoolBlurDS") operation as represented by:

$$\text{MaxPoolBlurDS}_{k,s}(X) = \text{Downsample}_s(\text{Blur}_{k_{blur}}(\text{MaxPool}_{k,1}(X))).$$

Specifically, the shift-invariant machine learning system 102 applies the blur kernel to the pooled feature values to generate the shift-adaptive feature values represented by the dashed line of the graph 708. For example, the shift-invariant machine learning system 102 selects a target feature value and applies the middle kernel weight (0.5) to the target feature value and applies the adjacent kernel weights (0.25) to adjacent feature values. This results in shift-adaptive feature values of [0.5, 0.75, 1, 0.75, 0.5, 0.75, 1, 0.75, 0.5]. In addition, the shift-invariant machine learning system 102 samples from the shift-adaptive feature values to generate downsampled, shift adaptive feature values. From the graph 708 of FIG. 7, the shift-invariant machine learning system 102 generates downsampled, shift-adaptive feature values of [0.5, 1, 0.5, 1, 0.5] from the original input and [0.75, 0.75, 0.75, 0.75] from the shifted input, as indicated by the left-pointing and right-pointing triangles in the graph 708. These feature values are closer to each other and are better representations of the intermediate signal.

Although FIG. 7 illustrates example results based on a particular blur kernel with specific kernel weights, alternative blur kernels and/or kernel weights are also possible. For example, in some embodiments the shift-invariant machine learning system 102 applies a low-pass filter with a larger blur kernel (i.e., that blurs feature values across more than three values) with smaller or larger kernel weights. In some embodiments, the shift-invariant machine learning system 102 receives user input (e.g., from the client device 108) to set a blur kernel size and/or kernel weights.

Figure 8:
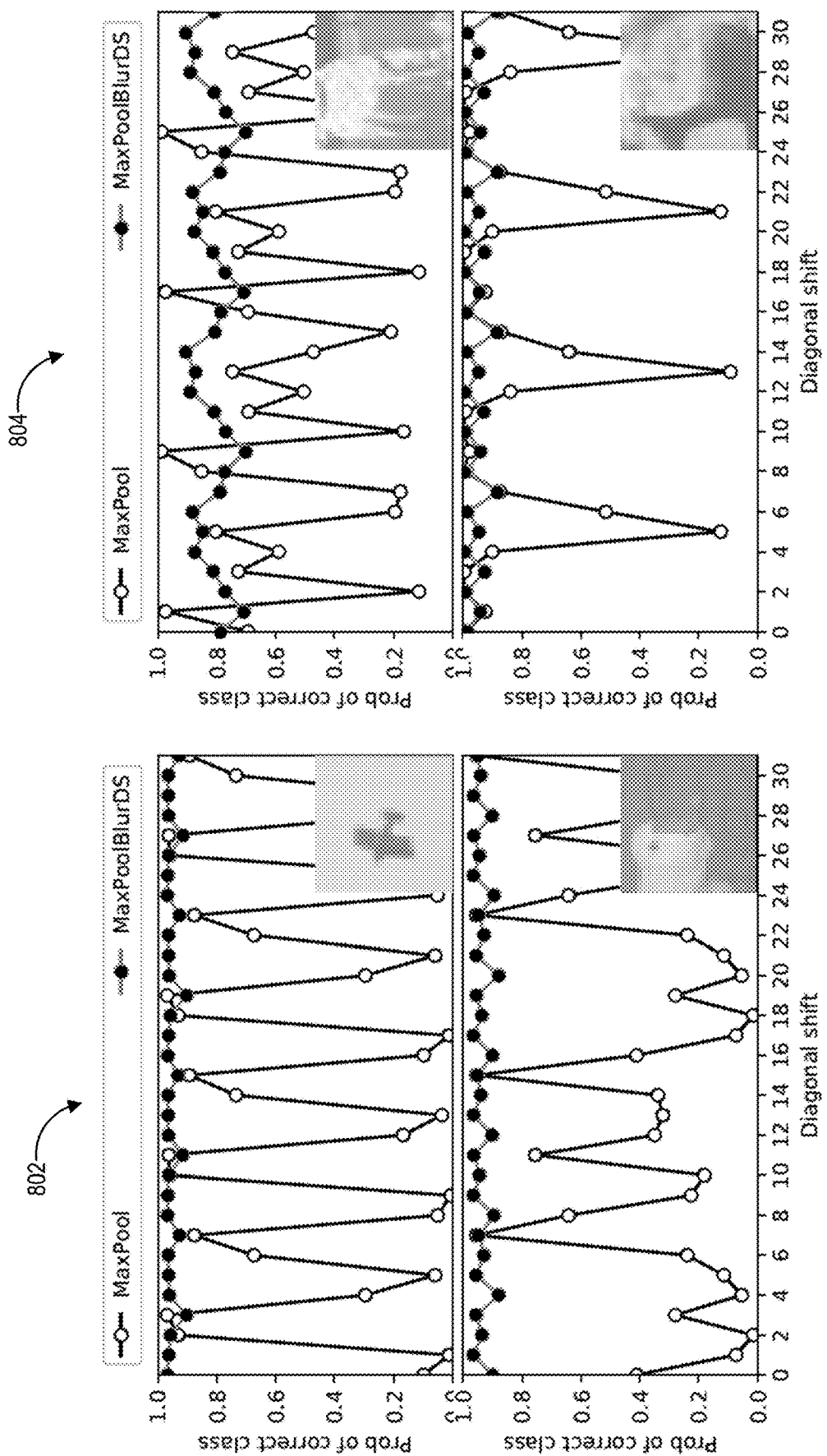
FIG. 8 illustrates various graphs of classification consistency of the shift-invariant machine learning system in accordance with one or more embodiments.

As mentioned, the shift-invariant machine learning system 102 generates shift-resilient neural network outputs. Indeed, FIG. 8 illustrates the stability of the shift-invariant machine learning system 102 in classifying digital images as compared to conventional image classification systems based on diagonal shifts in the input digital image. As illustrated in FIG. 8, the graphs 802, 804, 806, and 808 correspond to respective digital images. For example, the graph 802 corresponds to classifying a digital image of an airplane, while the graph 804 corresponds to classifying a digital image of a horse, the graph 806 corresponds to classifying a digital image of a bird, and the graph 808 corresponds to classifying a digital image of a deer.

In each of the graphs 802-808 of FIG. 8, the probability curves indicated by open circles represent probabilities of correctly classifying the respective digital image utilizing a conventional image classification system based on a conventional max-pooling operation, while applying a diagonal translation to the input. Conversely, the curves indicated by the filled circles represent the probabilities of correctly classifying the respective digital images utilizing the MaxPoolBlurDS operation of the shift-invariant machine learning system 102. As shown, the probability of the shift-invariant machine learning system 102 in each case is generally higher and more stable.

The increased stability and accuracy of the shift-invariant machine learning system 102 is due at least in part to the shift-adaptive nature of the internal layers of a neural network implemented by the shift-invariant machine learning system 102. To further illustrate the improvements in shift-adaptiveness throughout various layers of a neural network, FIG. 9 illustrates example layers 902 of a neural network as part of a conventional system ("baseline") as well as example layers 904 of a neural network as part of the shift-invariant machine learning system 102.

Figure 9:
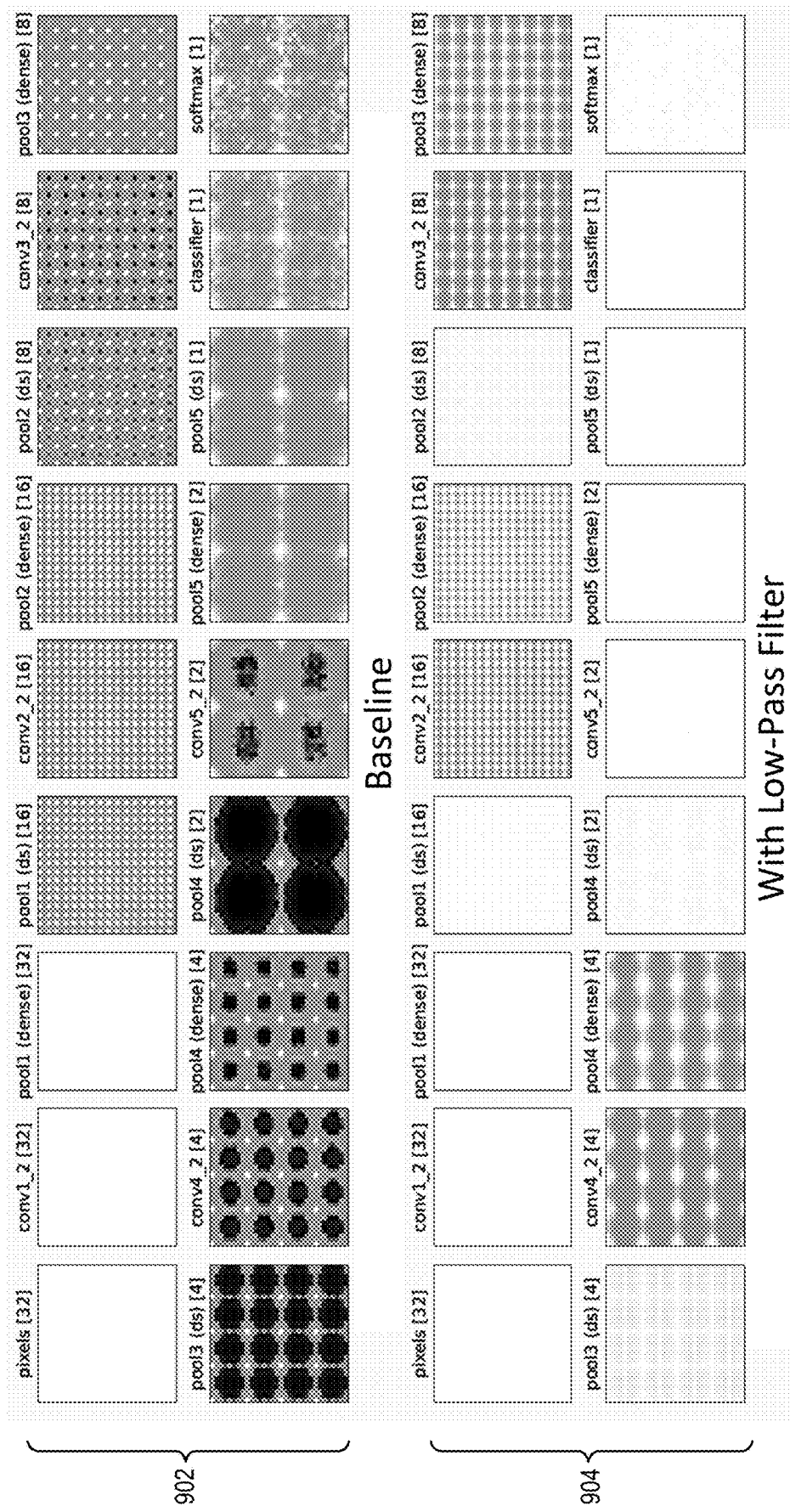
FIG. 9 illustrates example distance-related heat maps of example layers within neural networks to compare conventional systems with the shift-invariant machine learning system in accordance with one or more embodiments.

As illustrated in FIG. 9, the separate boxes are heat maps that represent individual layers within a neural network, where the shift and feature extraction operations are commuted to determine a distance in feature space across a test set, as represented by the shading of the heat maps. Each point in each heat map is a value of ($\Delta h$, $\Delta w$). The resolution of each respective layer is written within brackets [ . . . ]. Generally, lighter colors represent better shift-adaptiveness (e.g., better shift-equivariance), where perfectly white heat maps have perfect shift-adaptiveness (e.g., a distance of 0 at all shifts).

As shown, the baseline layers 902 of a conventional image classification system have features with a large distance (and therefore low shift-adaptiveness), especially the pool4 (ds) layer. Even at the classifier layer and the softmax layer of the conventional baseline system, the heat maps indicate a low degree of shift-adaptiveness. Thus, the conventional system generates outputs (e.g., classifications) that are inaccurate because of the inability of the conventional system to adapt to shifts in the input.

As further shown in FIG. 9, the shift-invariant machine learning system 102 provides shift-adaptiveness better than that of a conventional system. In FIG. 9, the shift-invariant machine learning system 102 utilizes a 5×5 triangle low-pass filter to generate the feature values represented by the heat maps of the example layers 904. In other embodiments, however, different low-pass filters are possible, as described above. As a result of applying the low-pass filter, the distances indicated by the heat maps of the example layers 904 are much lower than those of the example baseline layers 902. Looking especially to the classifier layer and the softmax layer, the shift-invariant machine learning system 102 generates feature values with very low (and sometimes 0) distances. Thus, the shift-invariant machine learning system 102 is highly adaptive to shifts in input and can thereby generate accurate, shift-resilient classifications (or other outputs).

Figure 10:
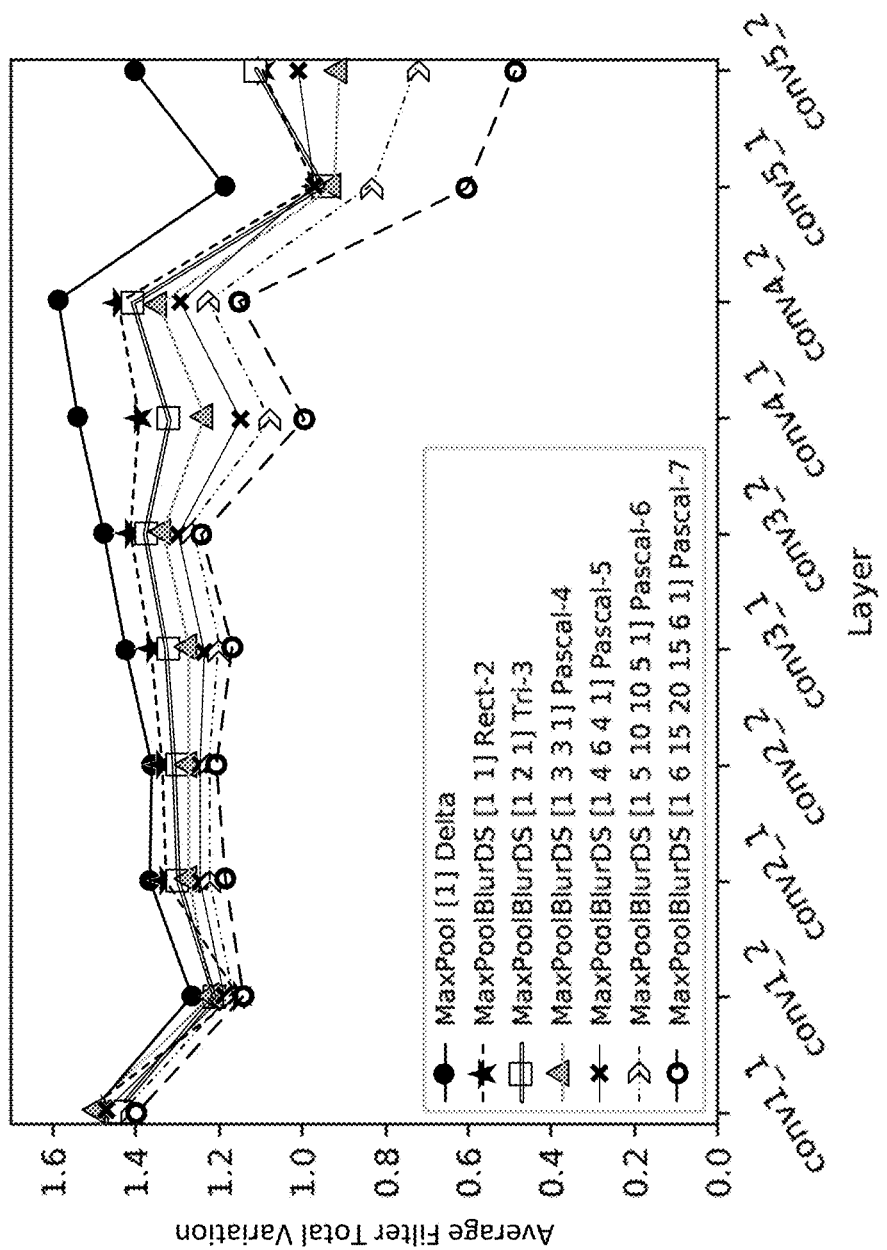
FIG. 10 illustrates an example graph to compare smoothness of feature extractors of the shift-invariant machine learning system as compared to a conventional image classification system in accordance with one or more embodiments.

In addition to improving accuracy in generating neural network outputs due to generating shift-adaptive feature maps, the shift-invariant machine learning system 102 further provides an unexpected result as a smoother feature extractor than conventional systems. To elaborate, FIG. 10 illustrates average smoothness of learned features. In particular, the different plots of FIG. 10 represent average filter total variation to depict spatial smoothness with respect to different systems and/or filter types.

As illustrate, the baseline ("MaxPool") operation of a conventional system is illustrated with closed circles and exhibits the highest total variation. The graph of FIG. 10 further illustrates total variation resulting from different filter types as implemented by the shift-invariant machine learning system 102. For instance, the operations of the shift-invariant machine learning system 102 ("MaxPool-BlurDS") with a Pascal-7 filter produces the lowest total variation. As indicated by the lower total variation of the different MaxPoolBlurDS operations of the shift-invariant machine learning system 102, the shift-invariant machine learning system 102 produces a smoother feature extractor than conventional systems, in addition to producing consistent, accurate outputs.

Figure 11:
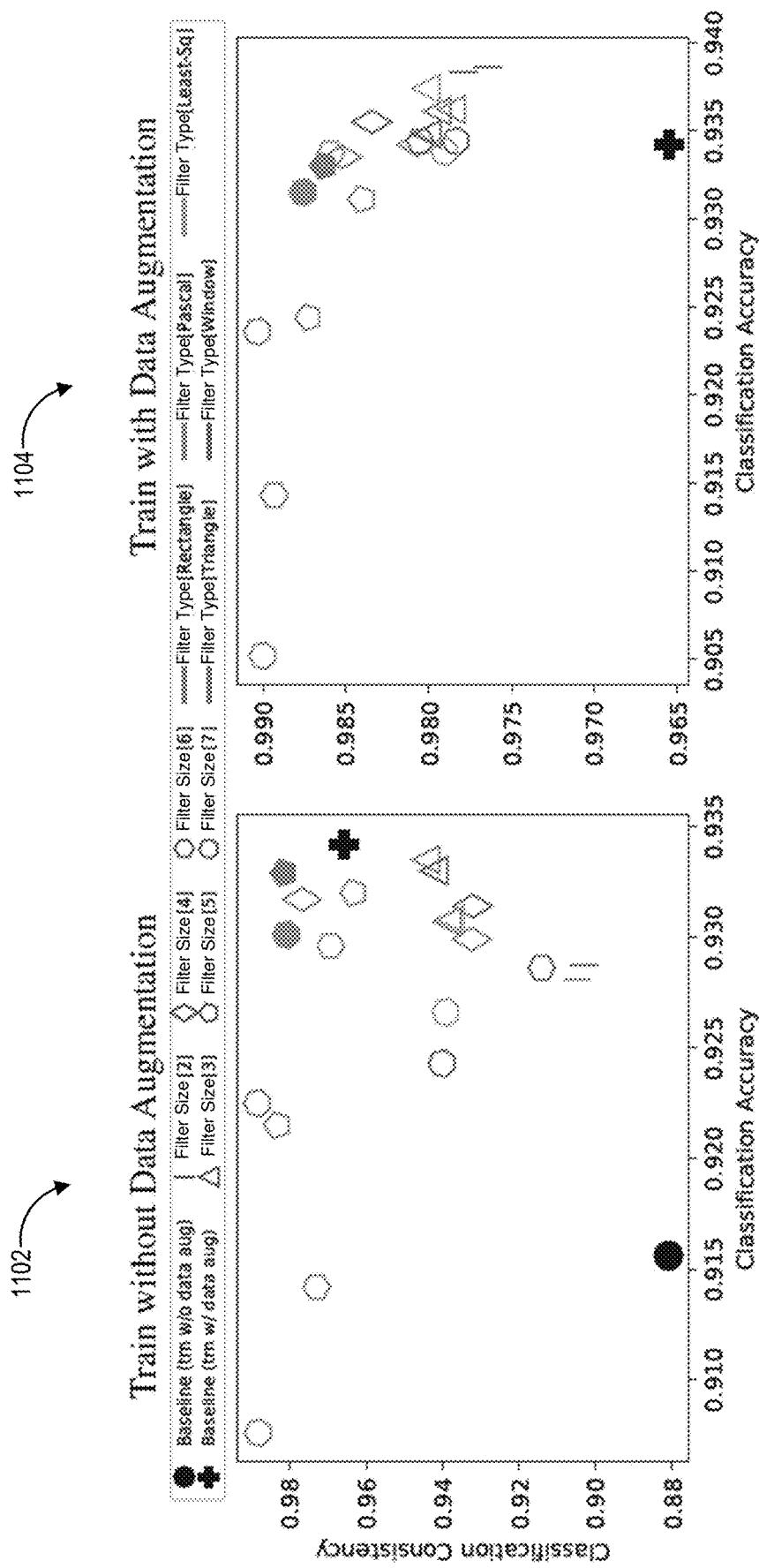

Regarding the improved accuracy and consistency of the shift-invariant machine learning system 102. FIG. 11 illustrates example improvements in consistency and accuracy of the shift-invariant machine learning system 102 compared to conventional baseline systems. To illustrate, the graphs 1102 and 1104 illustrate classification consistency on the y-axis and classification accuracy on the x-axis. The graph 1102 illustrates results based on training a neural network without data augmentation, while the graph 1104 illustrates results based on training a neural network with data augmentation. Additionally, graphs 1102 and 1104 illustrate various filter shapes and sizes as implemented by the shift-invariant machine learning system 102, as represented by the different shaded shapes within the graphs. The dark filled circle, however, represents a conventional baseline system trained without data augmentation, while the dark filled plus sign represents a conventional baseline system trained with data augmentation.

As shown in the graph 1102, the shift-invariant machine learning system 102 produces higher classification consistency than the baseline system trained without data augmentation. Additionally, the shift-invariant machine learning system 102 produces greater accuracy in most cases as well. Indeed, the shift-invariant machine learning system 102 produces very high consistency and accuracy (depending on the filter size and shape), especially for those filter types illustrated near the upper-right corner of the graph 1102. Even comparing against the conventional baseline system trained with data augmentation (represented by the dark filled plus sign), the shift-invariant machine learning system 102 produces greater consistency even without augmented training.

In addition, the graph 1104 illustrates that the shift-invariant machine learning system 102 produces greater consistency when trained with data augmentation than the conventional baseline system trained with data augmentation. As shown, the different filter shapes and sizes of the shift-invariant machine learning system 102 each show a higher degree of consistency. Additionally, many of the filter types result in a higher accuracy as well. Thus, as shown by the clustering of the shapes in the upper-right of the graph 1104, the shift-invariant machine learning system 102 produces high-quality outputs for a variety of filter shapes and sizes, where the outputs are both highly consistent and highly accurate (i.e., without sacrificing one for the other).

Figure 12:
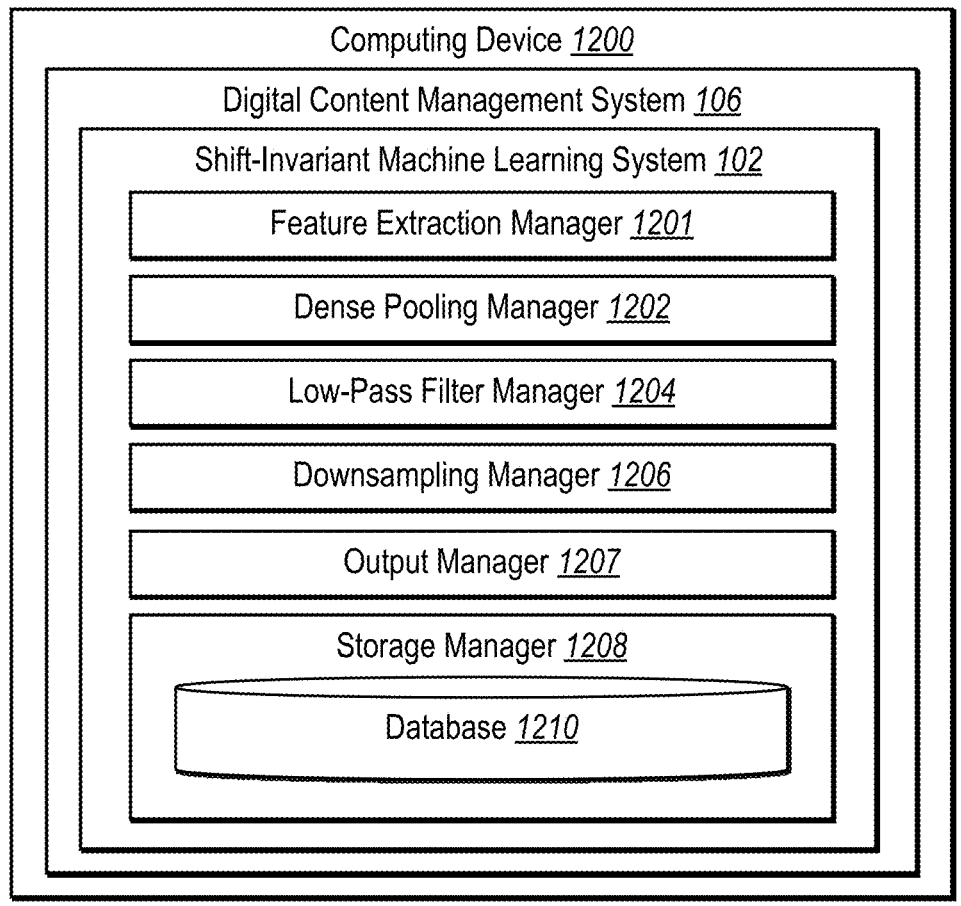
FIG. 12 illustrates an example schematic diagram of a shift-invariant machine learning system in accordance with one or more embodiments.

Looking now to FIG. 12, additional detail will be provided regarding components and capabilities of the shift-invariant machine learning system 102. Specifically, FIG. 12 illustrates an example schematic diagram of the shift-invariant machine learning system 102 on an example computing device 1200 (e.g., one or more of the client device 108 and/or the server(s) 104). As shown in FIG. 12, the shift-invariant machine learning system 102 may include a feature extraction manager 1201, a dense pooling manager 1202, a low-pass filter manager 1204, a downsampling manager 1206, an output manager 1207, and a storage manager 1208.

As just mentioned, the shift-invariant machine learning system 102 includes a feature extraction manager 1201. In particular, the feature extraction manager 1201 manages, extracts, generates, determines, identifies, produces, or obtains feature values based on one or more inputs. For example, the feature extraction manager 1201 generates feature values for a digital image, where each individual feature value corresponds to a separate pixel of the digital image. In some embodiments, the feature extraction manager 1201 generates feature values based on input other than digital images. The feature extraction manager 1201 can further communicate with the storage manager 1208 to store extracted feature values within the database 1210.

In addition, the shift-invariant machine learning system 102 includes a dense pooling manger 1202. In particular, the dense pooling manager 1202 manages, generates, determines, obtains, or extracts feature values based on an input (e.g., a digital image). For example, the dense pooling manager 1202 densely pools feature values to generate a pooled feature map of pooled feature values. The dense pooling manager 1202 can communicate with the storage manager 1208 to access and/or store data in the database 1210 such as training data (e.g., non-augmented or augmented training data and pooled feature values).

As also mentioned, the shift-invariant machine learning system 102 includes a low-pass filter manager 1204. In particular, the low-pass filter manager 1204 manages, generates, maintains, determines, obtains, or extracts low-pass feature values based on pooled feature values of a pooled feature map. For example, the low-pass filter manager 1204 utilizes a blur kernel as part of a low-pass filter manager to apply kernel weights to target feature values and adjacent feature values to thereby generate a shift-adaptive feature map. The low-pass filter manager 1204 can communicate with the dense pooling manager 1202 to access a pooled feature map to use as a basis for generating the shift-adaptive feature map. In addition, the low-pass filter manager 1204 can communicate with the storage manager 1208 to store shift-adaptive feature values within the database 1210.

In addition, the shift-invariant machine learning system 102 includes a downsampling manager 1206. In particular, the downsampling manager 1206 manages, maintains, generates, determines, obtains, or extracts a downsampled, shift-adaptive feature map. For example, the downsampling manager 1206 generates a downsampled, shift-adaptive feature map based on a shift-adaptive feature map. The downsampled, shift-adaptive feature map can communicate with the storage manager 1208 to access and/or store information in the database 1210 such as downsampled, shift-adaptive features.

Further, the shift-invariant machine learning system 102 includes an output manager 1207. In particular, the output manager 1207 manages, determines, generates, produces, or otherwise obtains a neural network output. For example, the output manager 1207 generates a classification for a digital image based on a downsampled, shift-adaptive feature map from the downsampling manager 1206. In some embodiments, the output manager 1207 generates a digital image classification in the form of a classification label such as "car," "person," "tree," etc. In other embodiments, such as those for applications other than digital image classification, the output manager 1207 generates different neural network outputs for applications such as, for example, denoising and/or demosaicing.

In one or more embodiments, each of the components of the shift-invariant machine learning system 102 are in communication with one another using any suitable communication technologies. Additionally, the components of the shift-invariant machine learning system 102 can be in communication with one or more other devices including one or more client devices described above. It will be recognized that although the components of the shift-invariant machine learning system 102 are shown to be separate in FIG. 12, any of the subcomponents may be combined into fewer components, such as into a single component, or divided into more components as may serve a particular implementation. Furthermore, although the components of FIG. 12 are described in connection with the shift-invariant machine learning system 102, at least some of the components for performing operations in conjunction with the shift-invariant machine learning system 102 described herein may be implemented on other devices within the environment.

The components of the shift-invariant machine learning system 102 can include software, hardware, or both. For example, the components of the shift-invariant machine learning system 102 can include one or more instructions stored on a computer-readable storage medium and executable by processors of one or more computing devices (e.g., the computing device 1200). When executed by the one or more processors, the computer-executable instructions of the shift-invariant machine learning system 102 can cause the computing device 1200 to perform the methods described herein. Alternatively, the components of the shift-invariant machine learning system 102 can comprise hardware, such as a special purpose processing device to perform a certain function or group of functions. Additionally or alternatively, the components of the shift-invariant machine learning system 102 can include a combination of computer-executable instructions and hardware.

Furthermore, the components of the shift-invariant machine learning system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the shift-invariant machine learning system 102 may be implemented as part of a stand-alone application on a personal computing device or a mobile device. Alternatively or additionally, the components of the shift-invariant machine learning system 102 may be implemented in any application that allows creation and delivery of marketing content to users, including, but not limited to, applications in ADOBE CREATIVE CLOUD or ADOBE MARKETING CLOUD, such as ADOBE ILLUSTRATOR, ADOBE PHOTOSHOP, ADOBE CAMPAIGN, and ADOBE ANALYTICS. "ADOBE," "ILLUSTRATOR," "PHOTOSHOP," "CAMPAIGN," and "ANALYTICS" are registered trademarks of Adobe Inc. in the United States and/or other countries.

FIGS. 1-12, the corresponding text, and the examples provide a number of different systems, methods, and non-transitory computer readable media for generating shift-resilient neural network outputs by utilizing dense pooling, low-pass filter, and downsampling layers. In addition to the foregoing, embodiments can also be described in terms of flowcharts comprising acts for accomplishing a particular result. For example, FIG. 13 illustrates a flowchart of an example sequence of acts in accordance with one or more embodiments.

Figure 13:
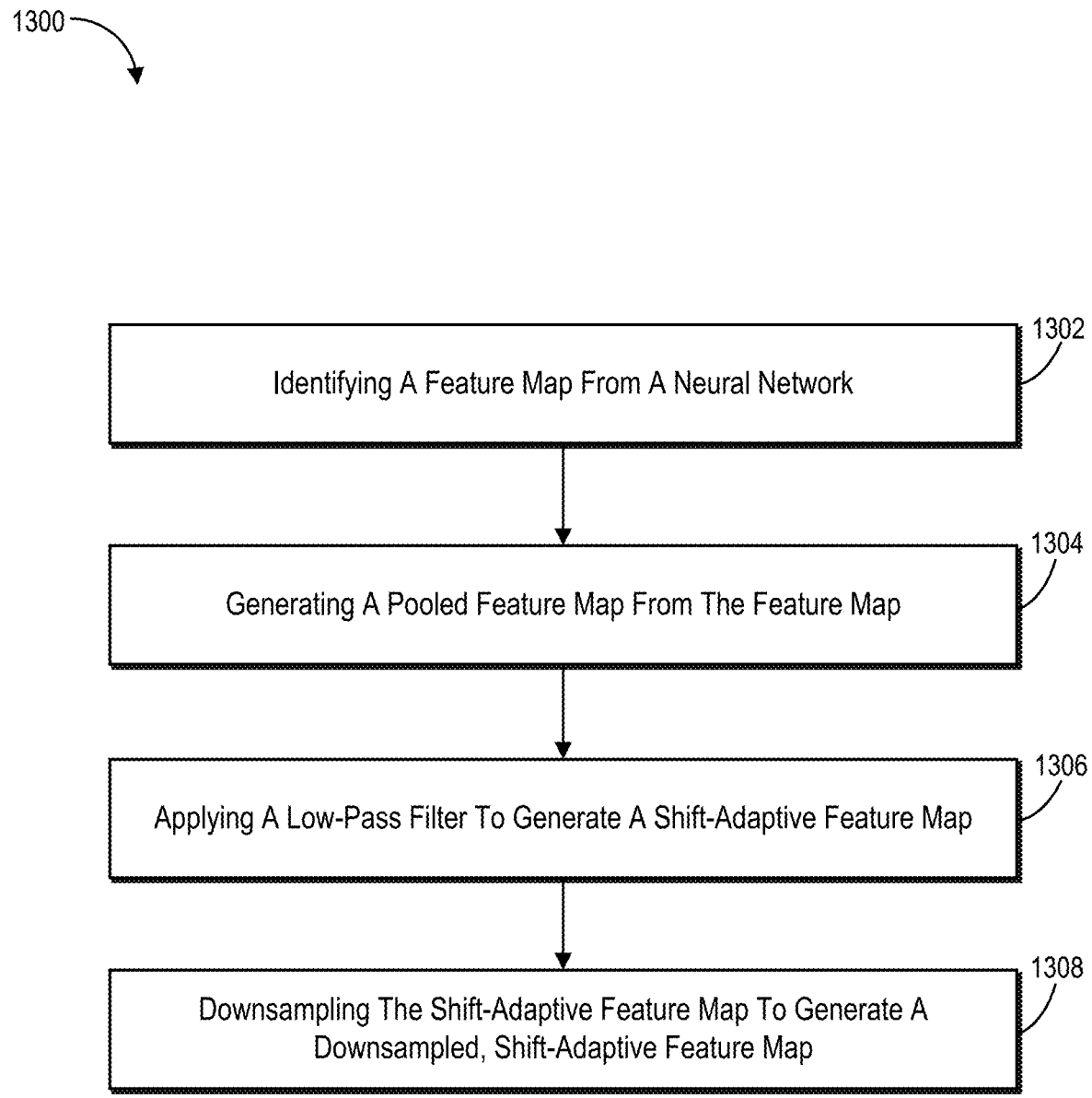
FIG. 13 illustrates an example flowchart of a series of acts for generating a shift-resilient neural network output in accordance with one or more embodiments.

While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIG. 13. In still further embodiments, a system can perform the acts of FIG. 13. Additionally, the acts described herein may be repeated or performed in parallel with one another or in parallel with different instances of the same or other similar acts.

FIG. 13 illustrates an example series of acts 1300 of generating a downsampled, shift-adaptive feature map for generating a shift-resilient neural network output. As illustrated, the series of acts includes an act 1302 of identifying a feature map from a neural network. In particular, the act 1302 can include identifying a feature map created from one or more layers of a neural network. The act 1302 can involve analyzing a digital image utilizing one or more feature extraction layers of the neural network to generate feature representations of pixels within the digital image. The neural network can include a deep convolutional neural network.

As shown, the series of acts 1300 also includes an act 1304 of generating a pooled feature map from the feature map. In particular, the act 1304 can include generating a pooled feature map from the feature map utilizing a dense pooling layer of the neural network. The series of acts 1300 can include an act of identifying, for a target feature value from the pooled feature map, a first feature value and a second feature value from the pooled feature map. Additionally, the series of acts 1300 can include an act of identifying, from the pooled feature map, a target feature value and an additional feature value, wherein the additional feature value comprises a lower value than the target feature value.

In addition, the series of acts 1300 includes an act 1306 of applying a low-pass filter to generate a shift-adaptive feature map. In particular, the act 1306 can include applying a low-pass filter to the pooled feature map to generate a shift-adaptive feature map. The act 1306 can involve determining, for one or more pooled feature values within the pooled feature map, a weighted combination of a pooled feature value and adjacent pooled feature values. The act 1306 can also involve blurring the pooled feature map, by applying a low-pass filter to the pooled feature map, to generate a shift-adaptive feature map corresponding to the pixels of the digital image.

The low-pass filter can include a blur kernel that includes kernel weights to apply to the one or more pooled feature values within the pooled feature map to determine the weighted combination. The series of acts 1300 can include an act of applying the kernel weights of the filter kernel to blur the pooled feature values within the pooled feature map. In addition, the series of acts 1300 can include an act of utilizing a blur kernel relative to the target feature value of the pooled feature map, wherein the blur kernel comprises a first kernel weight, a second kernel weight, and a third kernel weight. Further, the series of acts 1300 can include an act of applying the low-pass filter to reduce the target feature value based on the additional feature value. Blurring the pooled feature map can involve determining, via the low-pass filter, weighted combinations of pooled feature values within the pooled feature map. In addition, blurring the pooled feature map can involve applying the kernel weights of the blur kernel to pooled feature values of the pooled feature map to generate weighted combinations of the pooled feature values. The series of acts can additionally include acts of receiving an input to modify dimensions of the blur kernel and modifying the dimensions of the blur kernel in response to the received input.

Further, the series of acts 1300 includes an act 1308 of downsampling the shift-adaptive feature map to generate a downsampled, shift-adaptive feature map. In particular, the act 1308 can include downsampling the shift-adaptive feature map via a downsampling layer of the neural network to generate a downsampled, shift-adaptive feature map for utilization in generating a shift-resilient neural network output. The act 1308 can involve downsampling the shift-adaptive feature map via a downsampling layer of the neural network to generate a downsampled, shift-adaptive feature map corresponding to the pixels of the digital image. Additionally, the series of acts 1300 can include an act of generating, by applying the first kernel weight to the first feature value, the second kernel weight to the second feature value, and the third kernel weight to the target feature value, a shift-adaptive feature value corresponding to the target feature value.

Although not illustrated in FIG. 13, the series of acts 1300 can further include an act of generating, based on the downsampled, shift-adaptive feature map, a shift-resilient classification of the digital image. In addition, the series of acts 1300 can include an act of replacing the target feature value from the pooled feature map with the shift-adaptive feature value to generate the shift-adaptive feature map. The series of acts 1300 can include an act of analyzing, by utilizing the neural network, a second digital image comprising a shifted version of the digital image, as well as an act of generating, based on the downsampled, shift-adaptive feature map of the neural network, a second classification of the second digital image, wherein the second classification matches the shift-resilient classification.

Figure 14:
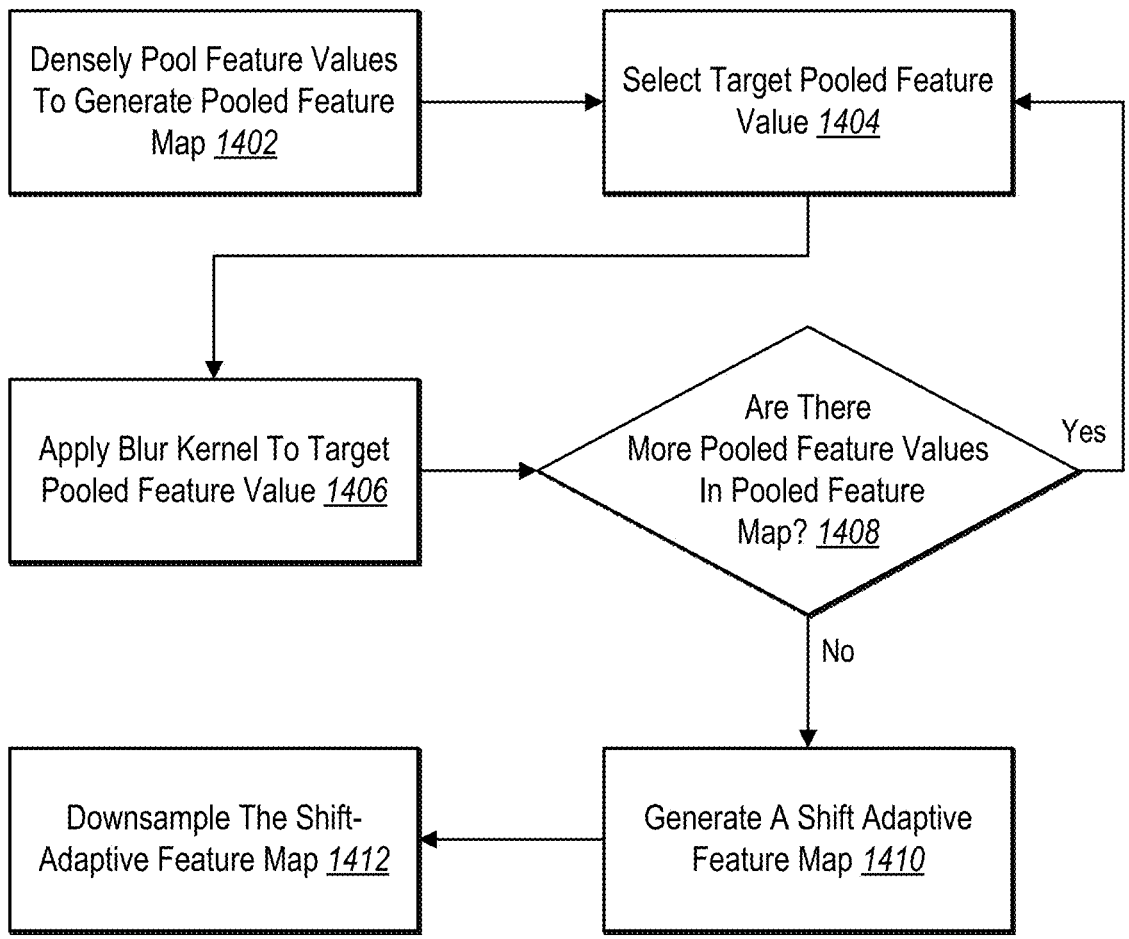
FIG. 14 illustrates an example flowchart of a series of acts in a step for generating a downsampled, shift-adaptive feature map utilizing a low-pass filter and a downsampling layer of a neural network in accordance with one or more embodiments.

As mentioned, the shift-invariant machine learning system 102 can perform a step for generating a downsampled, shift-adaptive feature map utilizing a low-pass filter and a downsampling layer of the neural network. For example, FIG. 14 illustrates a series of acts 1402-1412 involved in the step for generating a downsampled, shift-adaptive feature map utilizing a low-pass filter and a downsampling layer of the neural network.

In particular, the shift-invariant machine learning system 102 performs an act 1402 to densely pool feature values to generate a pooled feature map. More specifically, the shift-invariant machine learning system 102 generates a pooled feature map from a feature map that includes features extracted from an input such as a digital image. As described above, the shift-invariant machine learning system 102 utilizes a dense pooling operation to generate the pooled feature map.

As also illustrated, the shift-invariant machine learning system 102 performs an act 1404 to select a target pooled feature value from the pooled feature map. In particular, as described above the shift-invariant machine learning system 102 applies a low-pass filter by selecting a target feature value on which to center a blur kernel As shown, the shift-invariant machine learning system 102 performs an act 1406 to apply a blur kernel to the target pooled feature value. Indeed, as described above the shift-invariant machine learning system 102 applies the kernel weight corresponding to the placement of the blur kernel on the target pooled feature value, and further applies the kernel weights corresponding to adjacent pooled feature values that fall within the bounds of the blur kernel. The shift-invariant machine learning system 102 further performs an act 1408 to determine whether there are more pooled feature values in the pooled feature map that have not yet been blurred (i.e., low-pass filtered).

In response to determining that there are more pooled feature values to blur, the shift-invariant machine learning system 102 repeats the acts 1404 and 1406 until there are no more pooled feature values left to blur within the pooled feature map. The shift-invariant machine learning system 102 further performs an act 1410 to generate a shift-adaptive feature map based on the shift-adaptive feature values generated as a result of applying the blur kernel, as described above. Further, the shift-invariant machine learning system 102 performs an act 1412 to downsample the shift-adaptive feature map to generate a downsampled, shift-adaptive feature map. As also described above, the shift-invariant machine learning system 102 utilizes the downsampled, shift-adaptive feature map as a basis for generating shift-resilient neural network outputs (e.g., image classifications).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
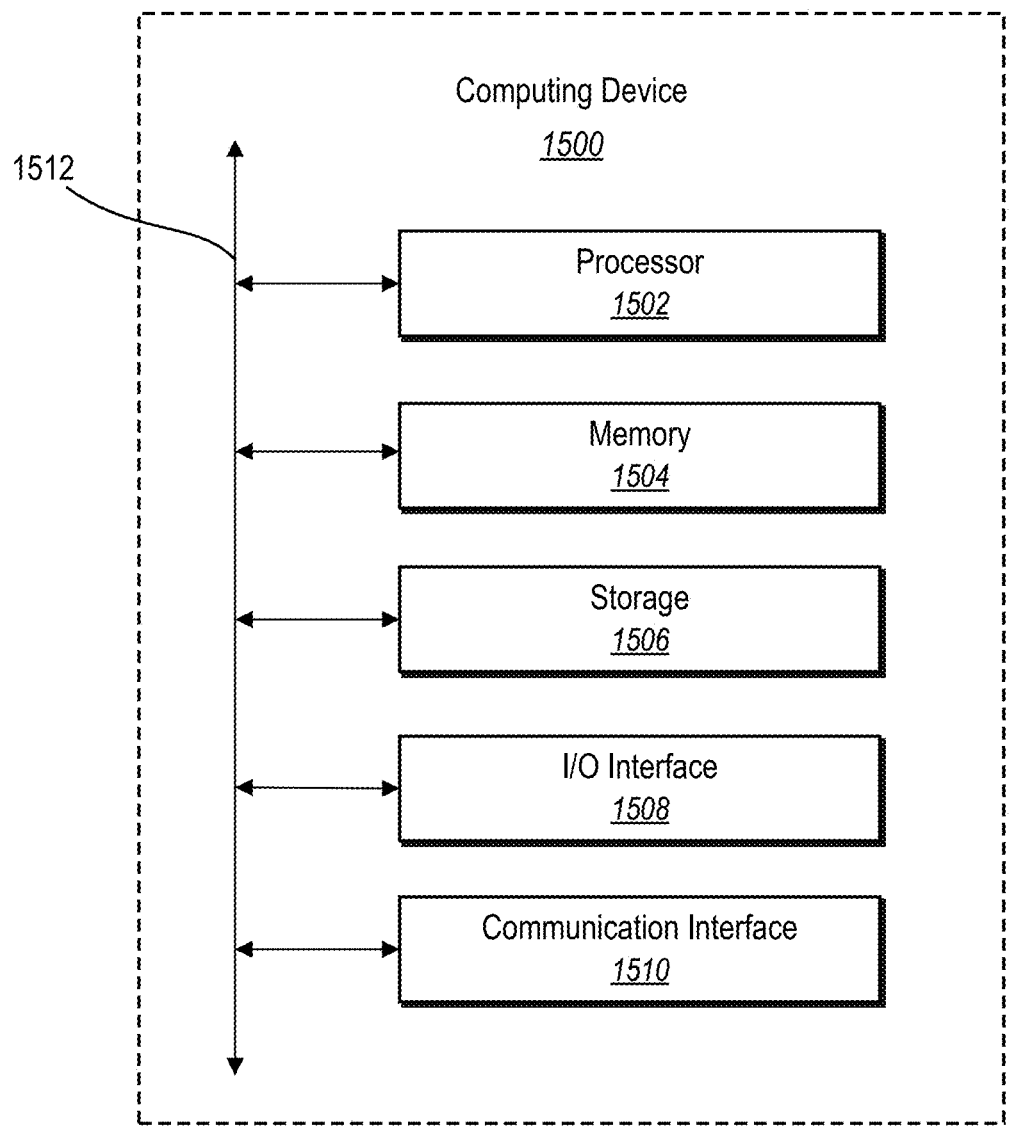
FIG. 15 illustrates a block diagram of an example computing device in accordance with one or more embodiments.

FIG. 15 illustrates, in block diagram form, an example computing device 1500 (e.g., the computing device 1500, the client device 108, and/or the server(s) 104) that may be configured to perform one or more of the processes described above. One will appreciate that the shift-invariant machine learning system 102 can comprise implementations of the computing device 1500. As shown by FIG. 15, the computing device can comprise a processor 1502, memory 1504, a storage device 1506, an I/O interface 1508, and a communication interface 1510. Furthermore, the computing device 1500 can include an input device such as a touchscreen, mouse, keyboard, etc. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, storage device 1506 can comprise a non-transitory storage medium described above. The storage device 1506 may include a hard disk drive (HDD), flash memory, a Universal Serial Bus (USB) drive or a combination of these or other storage devices.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a writing device or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computer device to:
    identify a feature map created from one or more layers of a neural network;
    generate a pooled feature map from the feature map utilizing a dense pooling layer of the neural network;
    apply a low-pass filter to the pooled feature map to generate a shift-adaptive feature map, wherein the low-pass filter comprises a blur kernel that includes kernel weights to apply to the pooled feature map; and
    downsample the shift-adaptive feature map via a downsampling layer of the neural network to generate a downsampled, shift-adaptive feature map for utilization in generating a shift-resilient neural network output.

2. The non-transitory computer readable medium of claim 1, further comprising instructions that, when executed by the at least one processor, cause the computer device to identify the feature map by analyzing a digital image utilizing one or more feature extraction layers of the neural network to generate feature representations of pixels within the digital image.

3. The non-transitory computer readable medium of claim 2, further comprising instructions that, when executed by the at least one processor, cause the computer device to generate, based on the downsampled, shift-adaptive feature map, a shift-resilient classification of the digital image.

4. The non-transitory computer readable medium of claim 1, further comprising instructions that, when executed by the at least one processor, cause the computer device to apply the low-pass filter to the pooled feature map by determining, for one or more pooled feature values within the pooled feature map, a weighted combination of a pooled feature value and adjacent pooled feature values.

5. The non-transitory computer readable medium of claim 1, further comprising instructions that, when executed by the at least one processor, cause the computer device to determine a weighted combination utilizing the low-pass filter to apply the kernel weights to one or more pooled feature values within the pooled feature map.

6. The non-transitory computer readable medium of claim 1, further comprising instructions that, when executed by the at least one processor, cause the computer device to apply the kernel weights of the blur kernel to blur pooled feature values within the pooled feature map.

7. The non-transitory computer readable medium of claim 1, wherein the neural network comprises a deep convolutional neural network.

8. The non-transitory computer readable medium of claim 1, further comprising instructions that, when executed by the at least one processor, cause the computer device to:
    identify, for a target feature value from the pooled feature map, a first feature value and a second feature value from the pooled feature map;

utilize a blur kernel relative to the target feature value of the pooled feature map, wherein the blur kernel comprises a first kernel weight, a second kernel weight, and a third kernel weight;

generate, by applying the first kernel weight to the first feature value, the second kernel weight to the second feature value, and the third kernel weight to the target feature value, a shift-adaptive feature value corresponding to the target feature value; and replace the target feature value from the pooled feature map with the shift-adaptive feature value to generate the shift-adaptive feature map.

9. The non-transitory computer readable medium of claim 1, further comprising instructions that, when executed by the at least one processor, cause the computer device to:

identify, from the pooled feature map, a target feature value and an additional feature value, wherein the additional feature value comprises a lower value than the target feature value; and apply the low-pass filter to reduce the target feature value based on the additional feature value.

10. A system comprising:

at least one processor; and a non-transitory computer readable medium comprising instructions that, when executed by the at least one processor, cause the system to:

analyze a digital image via one or more feature extraction layers of a neural network to extract a feature map corresponding to pixels of the digital image;

generate a pooled feature map from the feature map utilizing a dense pooling layer of the neural network;

blur the pooled feature map by applying a low-pass filter to the pooled feature map to generate a shift-adaptive feature map corresponding to the pixels of the digital image, wherein the low-pass filter comprises a blur kernel that includes kernel weights to apply to the pooled feature map;

downsample the shift-adaptive feature map via a downsampling layer of the neural network to generate a downsampled, shift-adaptive feature map corresponding to the pixels of the digital image; and generate, based on the downsampled, shift-adaptive feature map of the pixels, a shift-resilient classification of the digital image.

11. The system of claim 10, further comprising instructions that, when executed by the at least one processor, cause the system to blur the pooled feature map by determining, via the low-pass filter, weighted combinations of pooled feature values within the pooled feature map.

12. The system of claim 10, further comprising instructions that, when executed by the at least one processor, cause the system to determine weighted combinations of pooled feature values within the pooled feature map by utilizing the low-pass filter to apply the kernel weights to the pooled feature values.

13. The system of claim 10, further comprising instructions that, when executed by the at least one processor, cause the system to blur the pooled feature map by applying the kernel weights of the blur kernel to pooled feature values of the pooled feature map.

14. The system of claim 13, further comprising instructions that, when executed by the at least one processor, cause the system to:

receive an input to modify dimensions of the blur kernel; and modify the dimensions of the blur kernel in response to the received input.

15. The system of claim 10, wherein the neural network comprises a deep convolutional neural network.

16. The system of claim 10, wherein the downsampled, shift-adaptive feature map comprises a lower dimensionality than the shift-adaptive feature map.

17. A method comprising:

analyzing a digital image utilizing one or more feature extraction layers of a neural network to extract a feature map corresponding to pixels of the digital image;

a step for generating a downsampled, shift-adaptive feature map utilizing a low-pass filter and a downsampling layer of the neural network; and generating, based on the downsampled, shift-adaptive feature map, a shift-resilient classification of the digital image.

18. The method of claim 17, wherein the neural network comprises a deep convolutional neural network configured to classify digital images.

19. The method of claim 17, further comprising:

analyzing, by utilizing the neural network, a second digital image comprising a shifted version of the digital image; and generating, based on the downsampled, shift-adaptive feature map of the neural network, a second classification of the second digital image, wherein the second classification matches the shift-resilient classification.

20. The method of claim 17, wherein the low-pass filter comprises a blur kernel that includes kernel weights configured to blur the feature map corresponding to the pixels of the digital image.

* * * * *